United States Patent
Islam et al.

(10) Patent No.: US 10,749,644 B2
(45) Date of Patent: Aug. 18, 2020

(54) SYSTEM AND METHOD FOR EFFICIENT BANDWIDTH UTILIZATION

(71) Applicant: Huawei Technologies Co., Ltd., Shenzhen (CN)

(72) Inventors: Toufiqul Islam, Ottawa (CA); Kelvin Kar Kin Au, Kanata (CA); Jianglei Ma, Ottawa (CA); Liqing Zhang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/637,842

(22) Filed: Jun. 29, 2017

(65) Prior Publication Data
US 2018/0048435 A1 Feb. 15, 2018

Related U.S. Application Data

(60) Provisional application No. 62/412,024, filed on Oct. 24, 2016, provisional application No. 62/374,106, filed on Aug. 12, 2016.

(51) Int. Cl.
*H04L 5/00* (2006.01)
*H04W 72/00* (2009.01)
(Continued)

(52) U.S. Cl.
CPC ............ *H04L 5/001* (2013.01); *H04L 5/0007* (2013.01); *H04W 72/005* (2013.01); *H04W 72/0453* (2013.01); *H04W 72/121* (2013.01)

(58) Field of Classification Search
CPC ..... H04L 5/0007; H04L 5/001; H04L 5/0092; H04W 72/005; H04W 72/0453; H04W 72/121
See application file for complete search history.

(56) References Cited

U.S. PATENT DOCUMENTS

| 9,603,163 B2 * | 3/2017 | Yi ..................... H04W 72/1289 |
| 10,064,217 B2 * | 8/2018 | Rajagopal ............ H04B 7/0626 |

(Continued)

FOREIGN PATENT DOCUMENTS

| CN | 104094549 A | 10/2014 | |
| WO | WO-2017209585 A1 * | 12/2017 | ............... H04L 5/00 |
| WO | WO-2018060816 A1 * | 4/2018 | ........... H04L 5/0007 |

OTHER PUBLICATIONS

Fujitsu, TDD frame structure with mixed numerology, May 27, 2016, 3GPP TSG RAN WG1 Meeting #85, Tdoc: R1-164331 (Year: 2016).*

(Continued)

*Primary Examiner* — Eric Nowlin
(74) *Attorney, Agent, or Firm* — Slater Matsil, LLP

(57) ABSTRACT

Systems and method for defining sub-bands are provided. Each sub-band has a respective sub-carrier spacing, and at least one sub-band portion. Each sub-band portion has a channelization configuration including a resource block size configuration and a sub-band portion bandwidth. The sub-bands are allocated based on a sub-band configuration framework that includes a preconfigured set of possible sub-carrier spacings, a preconfigured set of possible resource block sizes, and a preconfigured set of possible sub-band portion bandwidths. In some embodiments, to improve bandwidth utilization, the channelization configuration for a given sub-band configures a plurality of resource blocks having a first number of sub-carriers and an additional resource block having a number of sub-carriers other than the first number. A bandwidth portion may include two bandwidth portions having different channelizations with differing numbers of sub-carriers per resource block such that more useful sub-carriers are used than would be pos- (Continued)

sible if only resource blocks having a largest of the differing numbers of sub-carriers were used.

21 Claims, 18 Drawing Sheets

(51) Int. Cl.
*H04W 72/04* (2009.01)
*H04W 72/12* (2009.01)

(56) References Cited

U.S. PATENT DOCUMENTS

| | | | |
|---|---|---|---|
| 2007/0274288 A1* | 11/2007 | Smith | H04L 5/0092 370/351 |
| 2008/0240275 A1 | 10/2008 | Cai | |
| 2009/0060081 A1* | 3/2009 | Zhang | H04L 1/0026 375/267 |
| 2010/0080308 A1 | 4/2010 | Yin et al. | |
| 2013/0195002 A1 | 8/2013 | Walker et al. | |
| 2013/0315178 A1* | 11/2013 | Lee | H04L 5/0053 370/329 |
| 2015/0180622 A1* | 6/2015 | Yoo | H04L 27/2602 370/330 |
| 2015/0282208 A1* | 10/2015 | Yi | H04L 1/1861 370/329 |
| 2015/0365263 A1* | 12/2015 | Zhang | H04L 1/0057 375/295 |
| 2016/0050666 A1* | 2/2016 | Yang | H04W 72/02 370/329 |
| 2017/0111930 A1* | 4/2017 | Rajagopal | H04B 7/0626 |
| 2017/0126439 A1* | 5/2017 | Yoshimoto | H04W 24/10 |
| 2017/0156140 A1 | 6/2017 | Islam | |
| 2017/0164350 A1* | 6/2017 | Sun | H04W 76/27 |
| 2017/0215170 A1 | 7/2017 | Islam | |
| 2017/0325256 A1* | 11/2017 | Islam | H04L 1/08 |
| 2017/0374652 A1* | 12/2017 | Islam | H04L 5/0053 |
| 2018/0007673 A1* | 1/2018 | Fwu | H04W 4/70 |
| 2018/0049169 A1* | 2/2018 | Lin | H04L 5/0051 |
| 2018/0063834 A1* | 3/2018 | Abedini | H04W 24/02 |
| 2018/0063835 A1* | 3/2018 | Abedini | H04W 24/02 |
| 2018/0110019 A1* | 4/2018 | Ly | H04W 56/001 |
| 2018/0183551 A1* | 6/2018 | Chou | H04W 72/044 |
| 2018/0192255 A1* | 7/2018 | Guo | H04L 12/189 |
| 2018/0199341 A1* | 7/2018 | Baldemair | H04W 72/0453 |
| 2019/0373667 A1* | 12/2019 | Jeon | H04W 72/1289 |

OTHER PUBLICATIONS

LG Electronics, Discussion on frame structure for NR, May 27, 2016, 3GPP TSG RAN WG1 Meeting #85, Tdoc: R1-164560 (Year: 2016).*
LG Electronics, Support different numerology and different usage scenarios, May 27, 2016, 3GPP TSG RAN WG1 Meeting #85, Tdoc: R1-164561 (Year: 2016).*
Ericsson, NR numerology, May 27, 2016, 3GPP TSG RAN WG1 Meeting #85, Tdoc: R1-164622 (Year: 2016).*
Ericsson, Mixed Numerology in an OFDM System, May 27, 2016, 3GPP TSG RAN WG1 Meeting #85, Tdoc: R1-164623 (Year: 2016).*
3GPP TSG RAN WG1 Meeting #85 R1-164619,"Flexibly Configured OFDM (FC-OFDM) waveform",Orange,May 23-27, 2016,total 14 pages.
3GPP TSG RAN WG1 #85 R1-163998,"Proposed set of numerologies for NR",Samsung,May 23-27, 2016,total 4 pages.
Panasonic, "Discussion on the multiplexing of different numerologies", 3GPP TSG-RAN WG1 Meeting #85, R1-164985, May 23-27, 2016, 6 Pages, Nanjing, China.
Ericsson, "Mixed Numerolgy in an OFDM System", 3GPP TSG RAN WG1 Meeting #85, R1-165833, May 23-27, 2016, 10 Pages, Nanjing, China.
NTT Docomo, Inc., "Initial link level evaluation of waveforms", 3GPP TSG RAN WG1 Meeting #84bis, R1-163110, Apr. 11-15, 2016, 19 Pages, Busan, Korea.
Huawei et al., "f-OFDM scheme and filter design", 3GPP TSG RAN WG1 Meetign #85, R1-165425, May 23-27, 2016, 10 Pages, Nanjing, China.

* cited by examiner

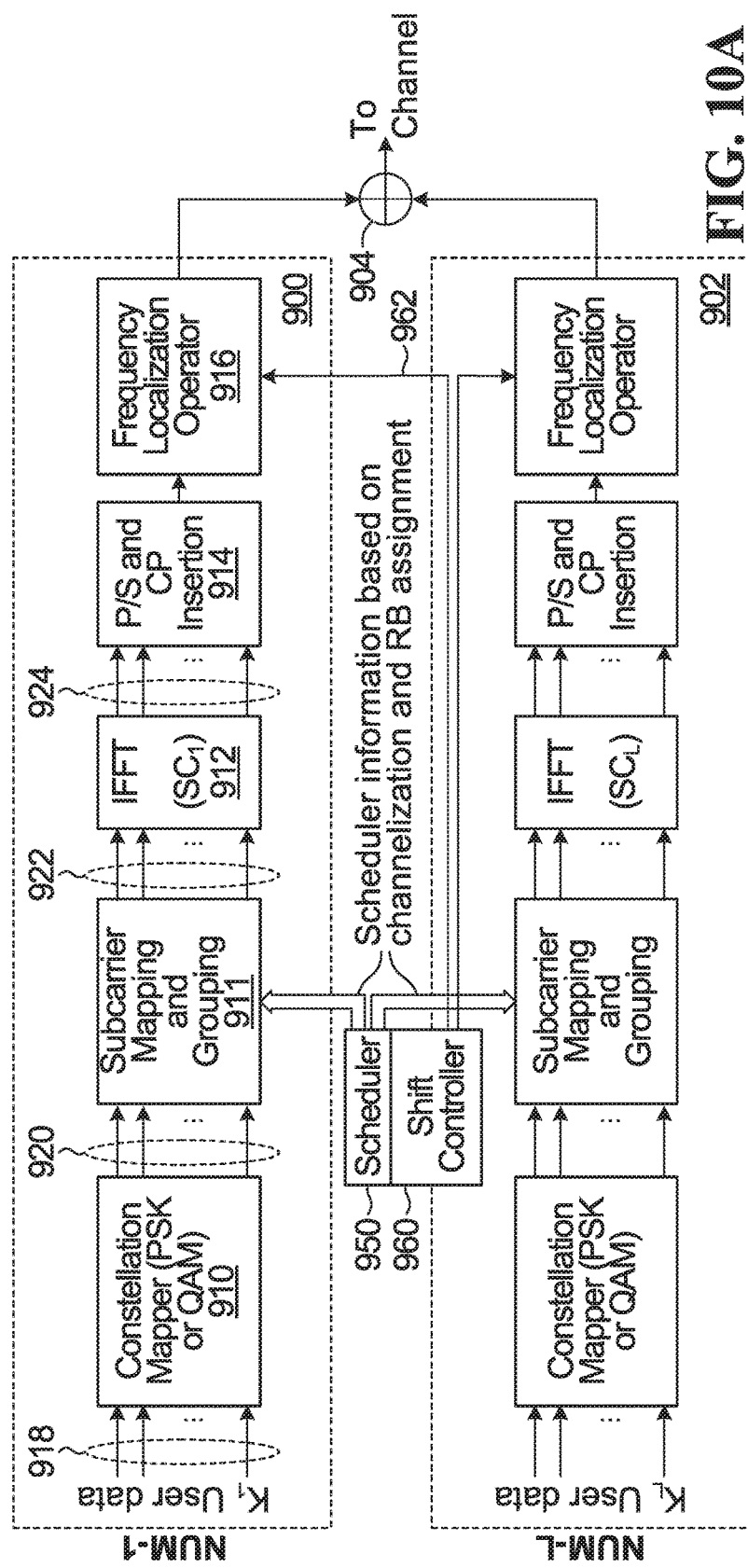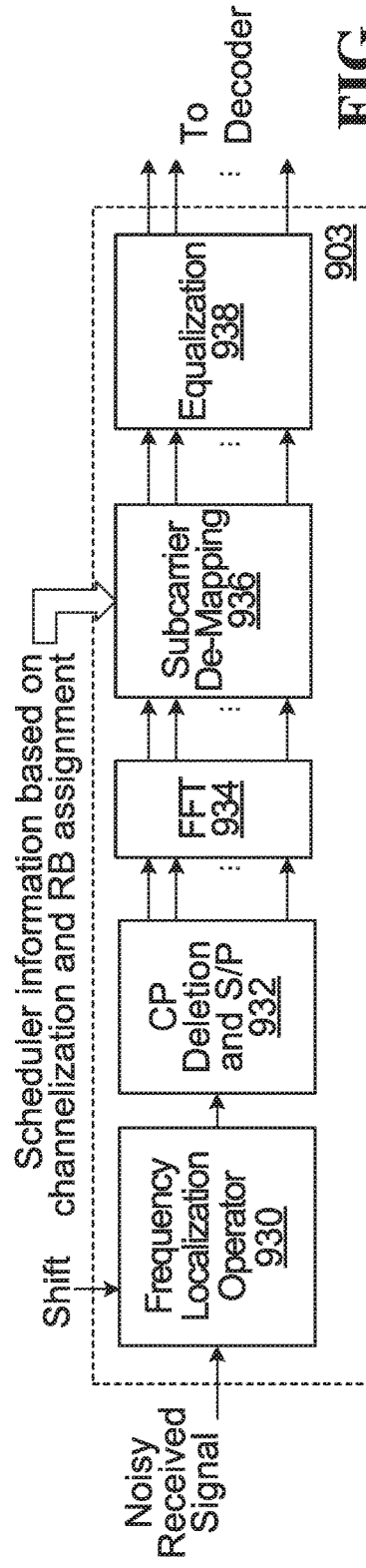
FIG. 10A
FIG. 10B

SYSTEM AND METHOD FOR EFFICIENT BANDWIDTH UTILIZATION

CROSS REFERENCE TO RELATED APPLICATIONS

This application claims priority to U.S. Provisional Application No. 62/374,106 filed Aug. 12, 2016 and to U.S. Provisional Application No. 62/412,024 filed Oct. 24, 2016. Each of these applications is incorporated by reference herein in its entirety.

FIELD

The application relates to systems and method for efficient use of bandwidth within one or more sub-bands within a carrier bandwidth.

BACKGROUND

In conventional networks, a carrier bandwidth is associated with a particular carrier frequency. Within an overall system bandwidth, there might be multiple carriers, each having a respective carrier bandwidth. Within each carrier bandwidth, respective guard bands are defined at the low frequency end and at the high frequency end to achieve channel separation between adjacent carriers. Guard bands are also defined between sub-bands on a single carrier. Throughout this description, reference is made to sub-bands of a single carrier. These can also be referred to as bandwidth parts or bandwidth partitions.

In wireless communications networks such as Long-Term Evolution (LTE) networks, Orthogonal Frequency Division Multiplexing (OFDM) transmissions use a 15 kHz spacing between two adjacent subcarriers for most applications. A 7.5 kHz subcarrier spacing was proposed for dedicated evolved Multimedia Broadcast Multicast Service (e-MBMS) service. A given transmitter transmits using one subcarrier spacing or the other. Resource block (RB) channelization involves defining resource blocks as the unit of allocation. In LTE, a respective fixed channelization is defined for each of the 15 kHz and 7.5 kHz options; the channelization for 15 kHz employs 12 subcarriers per resource block, and the channelization for 7.5 kHz employs 24 subcarriers per resource block. The resource blocks for both channelizations have 180 kHz bandwidth (BW).

In LTE, as discussed above, a frame structure is employed that is not flexible, and fixed resource block definitions are used. RB allocation to a user equipment (UE) is performed using an RB allocation indicator bitmap.

Long Term Evolution (LTE) for the most part imposes a 10% guard band usage between LTE useful spectrum and spectrum mask. It would be advantageous to have a more efficient bandwidth utilization, possibly with a reduced or minimized guard band compared to the approach adopted in LTE.

SUMMARY

A method for defining sub-bands is provided. Each sub-band has a respective sub-carrier spacing, and at least one sub-band portion. Each sub-band portion has a channelization configuration including a resource block size configuration and a sub-band portion bandwidth. The sub-bands are allocated or configured or signalled based on a sub-band configuration framework that includes a preconfigured set of possible sub-carrier spacings (more generally a preconfigured set of numerologies), and a preconfigured set of possible sub-band portion bandwidths, and optionally, a preconfigured set of possible resource block sizes. When there is only one portion, the sub-band configuration framework applies to the sub-band as a whole. Once the sub-bands are configured for a UE, transmissions are made in within one or multiple of the configured sub-band(s).

According to one aspect of the present disclosure, there is provided method in a UE, the method comprising receiving a configuration of at least one bandwidth part, the configuration of each bandwidth part comprising at least: one of a preconfigured set of possible numerologies; and one of a preconfigured set of possible bandwidth part bandwidths.

Optionally, receiving the configuration comprises receiving dynamic signaling activating the configuration of one or more of the at least one bandwidth part and a resource block allocation within one or more of the at least one configured bandwidth part.

Optionally, receiving the configuration comprises receiving signaling that semi-statically notifies the configuration of one or more of the at least one the bandwidth part, and receiving dynamic signaling that allocates resource blocks within one or more of the at least one configured bandwidth part.

Optionally, the method further comprises transmitting within the one or more of the at least one configured bandwidth parts using the allocated resource blocks.

According to another aspect of the present disclosure, there is provided a method comprising: allocating a plurality of sub-bands to a UE within a carrier bandwidth such that each sub-band has: a respective sub-carrier spacing; at least one sub-band portion, each sub-band portion having: a respective channelization configuration comprising at least a resource block size configuration; and a respective sub-band portion bandwidth; transmitting in accordance with the allocated sub-bands; wherein the sub-bands are allocated based on a sub-band configuration framework comprising: a preconfigured set of possible sub-carrier spacings; a preconfigured set of possible resource block sizes; and a preconfigured set of possible sub-band portion bandwidths; such that for each sub-band, the sub-band has one of the preconfigured set of possible sub-carrier spacings, and each sub-band portion has one of the preconfigured set of possible resource block sizes, and one of the preconfigured set of sub-band portion bandwidths.

Optionally, the method further comprises transmitting signaling defining or providing the configuration of the allocated plurality of sub-bands.

Optionally, the method further comprises transmitting scheduling information for each of the sub-bands.

Optionally, for one sub-carrier spacing or one numerology, at least two sub-bands are configured having the one sub-carrier spacing or one numerology, the method further comprising independently scheduling the at least two sub-bands.

Optionally, for one sub-carrier spacing, at least two sub-bands are configured having the one sub-carrier spacing, the method further comprising scheduling the at least two sub-bands together.

Optionally, the channelization configuration for a given sub-band configures: a plurality of resource blocks having a first number of sub-carriers; an additional resource block having a number of sub-carriers other than the first number.

Optionally, the method further comprises performing scheduling using a bitmap containing a respective bit for each of the plurality of resource blocks and the additional resource block.

Optionally, the method further comprises allocating a guard band between an edge of a spectrum mask and an edge of a sub-band that is adjacent to the edge of the spectrum mask.

Optionally, all sub-carriers of all the sub-bands are situated on a common grid; for at least one pair of adjacent sub-bands comprising a first sub-band having a first sub-carrier spacing and a second sub-band having a second sub-carrier spacing: a highest frequency sub-carrier of the first sub-band being spaced from a lowest frequency sub-carrier of the second sub-band by a spacing equal to an integer multiple of the smaller of the first and second sub-carrier spacings.

Optionally, the additional resource block has a number of sub-carriers such that all useful sub-carriers are used.

Optionally, the additional resource block is configured such that more useful sub-carriers are used than would be possible if only resource blocks having the first number of sub-carriers were used.

Optionally, the at least one bandwidth portion comprises at least two bandwidth portions having different channelizations with differing numbers of sub-carriers per resource block such that more useful sub-carriers are used than would be possible if only resource blocks having a largest of the differing numbers of sub-carriers were used.

Optionally, the method further comprises for at least one pair of adjacent sub-bands comprising a first sub-band having a first sub-carrier spacing and a second sub-band having a second sub-carrier spacing, at least one of: a) reserving at least one guard sub-carrier at an edge of the first sub-band adjacent the second sub-band; and b) reserving at least one guard sub-carrier at an edge of the second sub-band adjacent the first sub-band.

Optionally, the method further comprises adaptively defining guard sub-carriers employed in the pair of adjacent sub-bands.

Optionally, the adaptively configured guard sub-carriers are reserved through scheduling.

Optionally, all sub-carriers are configured on a grid having a spacing equal to a smallest sub-carrier spacing used in any of the sub-bands; for a first and a second of the sub-bands that are adjacent to each other, with the first sub-band being lower in frequency than the second sub-band, a highest frequency sub-carrier used in the first sub-band is spaced from a lowest frequency sub-carrier used in the second sub-band by a spacing equal to a multiple of the smaller of the first and second sub-carrier spacings.

Optionally, the method further comprises for at least one pair of adjacent sub-bands comprising a first sub-band having a first sub-carrier spacing and a second sub-band having a second sub-carrier spacing, at least one of: a) reserving a full or partial resource block at an edge of the first sub-band adjacent the second sub-band; and b) reserving a full or partial resource block at an edge of the second sub-band adjacent the first sub-band.

According to another aspect of the present disclosure, there is provided a base station comprising: a scheduler that allocates a plurality of sub-bands within a carrier bandwidth such that each sub-band has: a respective sub-carrier spacing; at least one sub-band portion, each sub-band portion having: a respective channelization configuration comprising at least a resource block size configuration; and a respective sub-band portion bandwidth; wherein the sub-bands are allocated based on a sub-band configuration framework comprising: a preconfigured set of possible sub-carrier spacings; a preconfigured set of possible resource block sizes; and a preconfigured set of possible sub-band portion bandwidths; such that for each sub-band, the sub-band has one of the preconfigured set of possible sub-carrier spacings, and each sub-band portion has one of the preconfigured set of possible resource block sizes, and one of the preconfigured set of sub-band portion bandwidths; a respective transmit chain for each sub-carrier spacing of the allocated sub-bands.

Optionally, the channelization configuration for a given sub-band configures: a plurality of resource blocks having a first number of sub-carriers; an additional resource block having a number of sub-carriers other than the first number.

Optionally, the at least one bandwidth portion comprises at least two bandwidth portions having different channelizations with differing numbers of sub-carriers per resource block such that more useful sub-carriers are used than would be possible if only resource blocks having a largest of the differing numbers of sub-carriers were used.

According to another aspect of the present disclosure, there is provided a method comprising: transmitting within a first sub-band using a plurality of sub-carriers with a first sub-carrier spacing; transmitting in a second sub-band using a plurality of sub-carriers with a second sub-carrier spacing, the first sub-band being lower in frequency than the second sub-band; wherein a highest frequency sub-carrier used in the first sub-band is spaced from a lowest frequency sub-carrier used in the second sub-band by a spacing equal to a multiple of the smaller of the first and second sub-carrier spacings.

Optionally, the spacing is equal to the smaller of the first and second sub-carrier spacings.

Optionally, the method further comprises transmitting first signaling identifying the space between the highest frequency sub-carrier used in the first sub-band and the lowest frequency sub-carrier used in the second sub-band as a multiple of the smaller of the first and second sub-carrier spacings.

Optionally, the method further comprises dynamically allocating at least one sub-carrier as a guard sub-carrier using scheduling, wherein the at least one sub-carrier is not used for data transmission for a duration of the dynamic allocation.

Optionally, dynamically allocating at least one sub-carrier as a guard sub-carrier using scheduling is performed based on one or a combination of: transmitter frequency localization capability; receiver frequency localization capability; transmitter frequency localization capability and receiver frequency localization capability; transmit waveform type.

Optionally, the method further comprises transmitting signalling to indicate the dynamically allocated at least one sub-carrier as a guard sub-carrier.

Optionally, the signaling comprises a bitmap containing a bit for each of a set of edge sub-carriers of a sub-band indicating whether the sub-carrier is a guard sub-carrier.

Optionally, the method further comprises transmitting scheduling information indicating to a receiver a set of sub-carriers to be processed by that receiver.

Optionally, a first sub-carrier of a first resource block for resource block channelization in the second sub-band starts is spaced from a last sub-carrier of a last resource block in the first sub-band by the multiple of the smaller sub-carrier spacing.

Optionally, a first sub-carrier of a first resource block for resource block channelization in the second sub-band starts is spaced from a last sub-carrier of a last resource block in the first sub-band by a multiple of resource block size for the smaller sub-carrier spacing.

According to another aspect of the present disclosure, there is provided a network element configured to implement any of the methods summarized above.

According to another aspect of the present disclosure, there is provide a method comprising: receiving signaling indicating a shift in sub-carrier location of a sub-band as a multiple of a grid spacing; receiving a transmission within the sub-band using a plurality of sub-carriers with a sub-carrier spacing that is an integer multiple ≥2 times the sub-carrier grid spacing, the plurality of sub-carriers positioned on a grid of frequencies having the grid spacing; wherein: the grid has an edge frequency that is the highest frequency on the grid within the sub-band, and the plurality of sub-carriers is offset lower in frequency from the edge frequency by an amount indicated by the shift; or the grid has an edge frequency that is the lowest frequency on the grid within the sub-band, and the plurality of sub-carriers is offset higher in frequency from the edge frequency by an amount indicated by the shift.

Optionally, the method further comprises receiving dynamic signaling indicating one or more sub-carriers to be guard sub-carriers.

According to another aspect of the present disclosure, there is provided a user equipment configured to implement any of the methods of summarized above.

According to another aspect of the present disclosure, there is provided a network element. The network element has a a processor and a memory. The network element is configured to transmit within a first sub-band using a plurality of sub-carriers with a first sub-carrier spacing. The network element is further configured to transmit within a second sub-band using a plurality of sub-carriers with a second sub-carrier spacing, the first sub-band being lower in frequency than the second sub-band. A highest frequency sub-carrier used in the first sub-band is spaced from a lowest frequency sub-carrier used in the second sub-band by a spacing equal to a multiple of the smaller of the first and second sub-carrier spacings.

According to another aspect of the present disclosure, there is provided a user equipment. The user equipment has a processor and a memory. The user equipment is configured to receive signaling indicating a shift in sub-carrier location of a sub-band as a multiple of a grid spacing. The user equipment is further configured to receive a transmission within the sub-band using a plurality of sub-carriers with a sub-carrier spacing that is an integer multiple of the sub-carrier grid spacing, wherein the integer multiple is greater than or equal to two, the plurality of sub-carriers positioned on a grid of frequencies having the grid spacing. The grid has an edge frequency that is the highest frequency on the grid within the sub-band, and the plurality of sub-carriers is offset lower in frequency from the edge frequency by an amount indicated by the shift; or the grid has an edge frequency that is the lowest frequency on the grid within the sub-band, and the plurality of sub-carriers is offset higher in frequency from the edge frequency by an amount indicated by the shift.

According to any of the preceding aspects of the present disclosure, a resource block configuration may comprise frequency domain channelization, i.e., number of sub-carriers and time domain channelization, i.e., number of symbols. The number of symbols contained within a resource block may vary dynamically or semi-statically based on the indicated transmission duration to a UE. The symbols that comprise a resource block may or may not be contiguous. In other words, some or all aspects of resource block configuration may be UE specific.

It should be understood that any of the embodiments described herein can be applied for bandwidth allocation and scheduling/resource allocation for uplink or downlink communications. For example, dynamic signaling can be received by a UE which may contain activation of at least one downlink bandwidth part and/or at least one uplink bandwidth part and resource block allocation is made within the allocated bandwidth part(s).

BRIEF DESCRIPTION OF THE DRAWINGS

Embodiments of the disclosure will now be described with reference to the attached drawings in which:

FIGS. 10A and 10B are block diagrams of a transmitter and a receiver respectively;

DETAILED DESCRIPTION

Figure 1A:
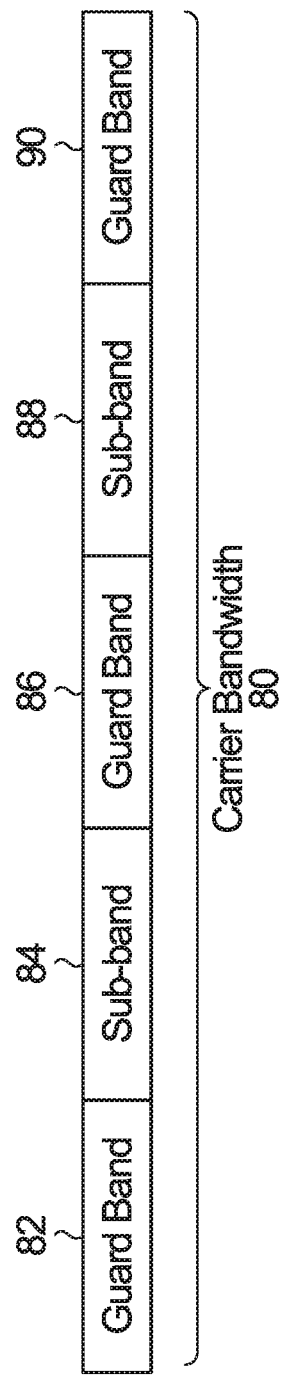
FIG. 1A shows a carrier bandwidth divided into sub-bands separated by guard bands.

Generally, embodiments of the present disclosure provide a method and system for providing efficient bandwidth utilization. Different services are envisioned to be supported by next generation wireless communication technologies. As spectrum resource is scarce, efficient bandwidth utilization mechanisms are of paramount importance to support different services with diverse bandwidth requirements in a common spectrum. For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein. Throughout this description, references to define, defining, definition also encompass configure, configuring and configuration.

Frame structures have been proposed that are flexible in terms of the use of differing numerologies. A numerology, for example, is defined in terms of some parameters including, for example, subcarrier spacing, OFDM useful symbol duration and cyclic prefix (CP), and may also be defined by other parameters such as inverse fast Fourier transform (IFFT) length, and Transmission Time Interval (TTI) length, also referred to as a slot, or duration. These numerologies may be scalable in the sense that subcarrier spacings are multiples of each other as between the differing numerologies, and TTI lengths (in seconds) are also multiples of each other as between differing numerologies. The minimum scheduling unit for different numerologies may have the same or different numbers of symbols. For example, a slot may have 7 symbols for one numerology and 14 symbols for another. Such a scalable design across multiple numerologies provides implementation benefits, for example scalable total OFDM symbol duration in a time division duplex (TDD) context. See also Applicant's U.S. provisional application No. 62/169,342 to Liqing Zhang et al., entitled "System and Scheme of Scalable OFDM Numerology", hereby incorporated by reference in its entirety, which provides systems and methods with scalable numerologies.

Table 1 below contains an example of a flexible frame structure design with scalable numerologies in the four columns under "Frame structure". Frames can be built using one or a combination of the four scalable numerologies. For comparison purposes, in the right hand column of the table, the conventional fixed LTE numerology is shown. In Table 1, each numerology uses a first cyclic prefix (CP) length for a first number of OFDM symbols, and a second cyclic prefix length for a second number of OFDM symbols. For example, in the first column under "Frame structure", the TTI includes 3 symbols with a cyclic prefix length of 1.04 µs followed by 4 symbols with a cyclic prefix length of 1.3 µs. The numbers in brackets, e.g. (32, 42 point) indicate the number of OFDM sub-carriers used for the CP for the two different CP lengths.

Fast Fourier Transform (FFT) size is the number of OFDM subcarriers in the OFDM symbol. CP overhead is the percentage of resources dedicated to transmission of the CP.

The first column is for a numerology with 60 kHz subcarrier spacing that also has the shortest OFDM symbol duration. This may be suitable for ultra-low latency communications, such as Vehicle-to-Any (V2X) communications, and industrial wireless control applications. The second column is for a numerology with 30 kHz subcarrier spacing. The third column is for a numerology with 15 kHz subcarrier spacing. This numerology has the same configuration as in LTE for CP length, except that there are only 7 symbols in a TTI whereas there are 14 symbols in a TTI in LTE for 15 kHz. This may be suitable for broadband services. The fourth column is for a numerology with 7.5 kHz spacing, which also has the longest OFDM symbol duration among the four numerologies. This may be useful for coverage enhancement and broadcasting. Of the four numerologies listed, those with 30 kHz and 60 kHz subcarrier spacings are more robust to Doppler spreading (fast moving conditions), because of the wider subcarrier spacing.

TABLE 1

Example set of Numerologies Parameters

| | Frame structure | | | | Baseline (LTE) |
|---|---|---|---|---|---|
| TTI Length | 0.125 ms | 0.25 ms | 0.5 ms | 1 ms | TTI = 1 ms |
| Subcarrier spacing | 60 kHz | 30 kHz | 15 kHz | 7.5 kHz | 15 kHz |
| FFT size | 512 | 1024 | 2048 | 4096 | 2048 |
| Symbol duration | 16.67 µs | 33.33 µs | 66.67 µs | 133.33 µs | 66.67 µs |
| #symbols in each TTI | 7 (3.4) | 7 (3.4) | 7 (3.4) | 7 (3.4) | 14 (2.12) |
| CP length | 1.04 µs, 1.30 µs (32.40 point) | 2.08 µs, 2.60 µs, (64.80 point) | 4.17 µs, 5.21 µs (128.160 point) | 8.33 µs, 10.42 µs (256.320 point) | 5.2 µs, 4.7 µs (160.144 point) |
| CP overhead | 6.67% | 6.67% | 6.67% | 6.67% | 6.67% |

It should be understood that the specific numerologies of the example of Table 1 are for illustration purposes, and that a flexible frame structure combining other numerologies can alternatively be employed. It is obviously understood that the example set of numerologies parameters is shown in Table 1 for illustration purposes, and that other suitable set of numerologies parameters may be employed.

In one embodiment, OFDM-based signals can be employed to transmit a signal in which multiple numerologies coexist simultaneously. More specifically, in some implementations, multiple sub-band OFDM signals can be generated in parallel, each within a different sub-band, and each sub-band having a different subcarrier spacing (and more generally with a different numerology). The multiple sub-band signals are combined into a single signal for transmission, for example for downlink transmissions. Alternatively, the multiple sub-band signals may be transmitted from separate transmitters, for example for uplink transmissions from multiple user equipments (UEs). In a specific example, filtered OFDM (f-OFDM) can be employed. With f-OFDM, filtering is employed to shape the spectrum of each sub-band OFDM signal, and the sub-band OFDM signals are then combined for transmission. f-OFDM lowers out-of-band emission and improves transmission, and addresses the non-orthogonality introduced as a result of the use of different subcarrier spacings.

As noted above, within each carrier bandwidth, respective guard bands are defined at the low frequency end and at the high frequency end to achieve channel separation between adjacent carriers and between sub-bands on a single carrier. A result of the inclusion of the guard bands is partial band utilization. FIG. 1A is a logical diagram showing an example of partial band utilization. Shown is a carrier bandwidth 80. The carrier bandwidth 80 is divided into guard bands 82,90 at the edges of the carrier bandwidth 80. Between the guard bands 82,90, there are two sub-bands 84,88 separated by a guard band 86. Within the carrier bandwidth 80 a channelization framework is defined such that resources can be allocated only within the sub-bands 84,88.

A guard band between neighboring sub-bands is typically provided that is multiple sub-carriers in width. Such a guard band is set, in particular to allow for the possibility that neighboring sub-bands employ a high MCS and/or have large power fluctuations. Guard bands between adjacent sub-carriers take away from the bandwidth available for data. Embodiments of the disclosure provide systems and methods of bandwidth utilization that may reduce or in some cases remove the impact of guard bands on bandwidth utilization.

In one embodiment, a guard band may be needed between sub-bands that share an edge within the carrier bandwidth, and may be needed between adjacent sub-bands. Depending on filtering capability, a guard band between adjacent sub-bands and a guard band between sub-band edge and spectrum mask that are smaller than the 10% stipulated by LTE may be realizable, where the percentage indicates how much of a band is used as a guard band. For example, in LTE, 10% of a 20 MHz band is used guard band and the rest for data. For example, for some bandwidths, filtered OFDM (F-OFDM) may need only ~2% guard band, if filters with adequate filter order are used. The sub-carriers available for data transmission accounting for the possible allocation of sub-carriers as guard sub-carriers, are referred to herein as useful sub-carriers. A fixed channelization may not always result in full utilization of useful sub-carriers.

In systems with large carrier bandwidths, such as 100 MHz or more, it may be difficult to implement a FFT size spanning all or a significant fraction of the carrier bandwidth, necessitating multiple smaller sub-bands. Any inefficiencies in the utilization of the sub-bands translates into reduced efficiency of the overall carrier bandwidth.

Figure 1B:
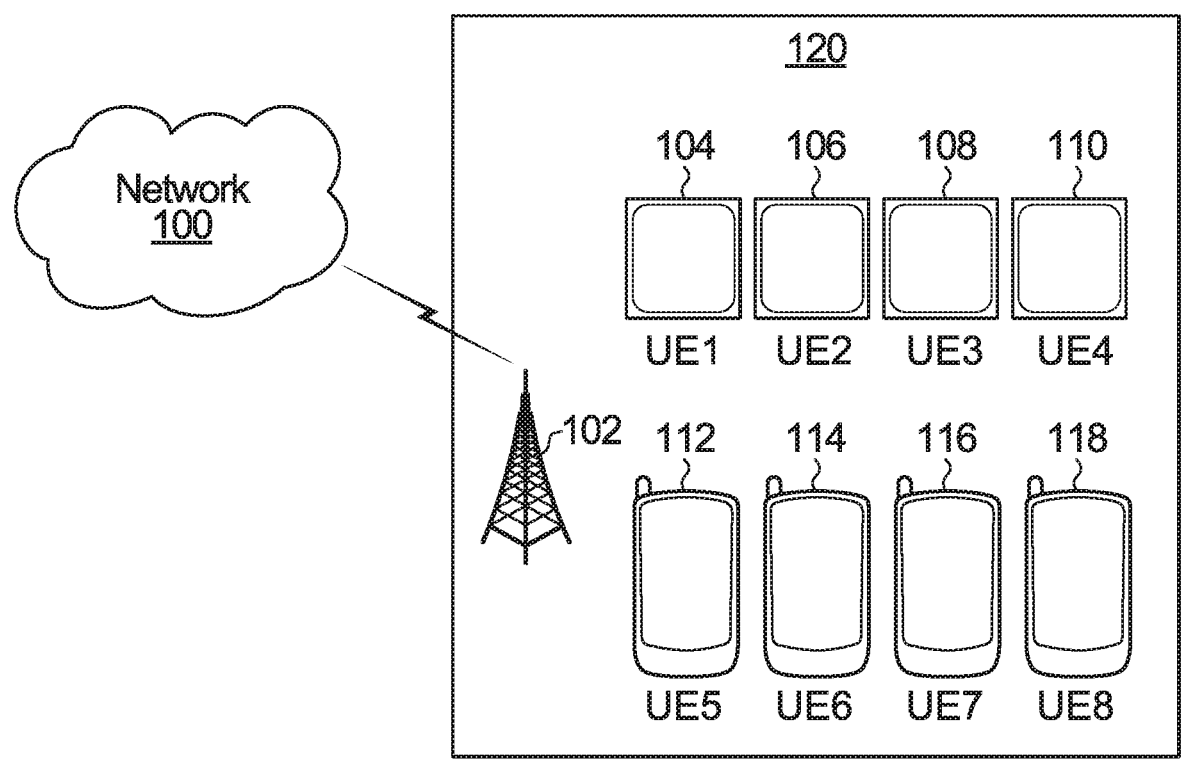
FIG. 1B is a block diagram of a network configured to implement coexistence of mixed services in a TDD flexible frame structure.

Referring to FIG. 1B, a schematic diagram of a network 100 is shown. A base station (BS) 102 provides uplink and downlink communication with the network 100 for a plurality of UEs 104-118 within a coverage area 120 of the BS 102. In a specific example, UEs 104-110 are UEs that require low latency, and have sporadic traffic requirements, and UEs 112-118 are UEs that do not have as tight a latency requirement, and may have more consistent traffic requirements, at least when active. In a more specific example, the UEs 104-110 employ orthogonal frequency division multiplexing (OFDM) to transmit ultra reliable low latency communication (URLLC) traffic. It is contemplated that OFDM may be used in combination with orthogonal multiple access or a non-orthogonal multiple access scheme such as Sparse Code Multiple Access (SCMA). UEs 112-118 may, for example, transmit enhanced mobile broadband (eMBB) traffic. UEs 112-118 may also use OFDM in combination with orthogonal multiple access or a non-orthogonal multiple access scheme. Each UE may represent any suitable end user device for wireless operation and may include such devices (or may be referred to) as a wireless transmit/receive unit (WTRU), mobile station, fixed or mobile subscriber unit, cellular telephone, station (STA), machine type communication device (MTC), personal digital assistant (PDA), smartphone, laptop, computer, touchpad, wireless sensor, or consumer electronics device. The BS 102 may, for example, include (or be) one or more of several well-known devices, such as a base transceiver station (BTS), a Node-B (NodeB), an evolved NodeB (eNodeB), a Home eNodeB, a gNodeB (sometimes called a "gigabit" NodeB), a transmission point (TP), a transmission and reception point (TRP), a site controller, an access point (AP), or a wireless router. The described functions of the BS 102 may also be performed by multiple base stations using synchronous downlink transmission. FIG. 1 shows one BS 102 and eight UEs 104-118 for illustrative purposes, however there may be more than one BS 102 and the coverage area 120 of the BS 102 may include more or fewer than eight UEs 104-118 in communication with the BS 102.

In some embodiments, a carrier bandwidth is partitioned into sub-bands, for example for the purpose of servicing two or more different traffic types such as URLLC, massive machine type communication (m MTC) and eMBB. Systems and methods of defining the sub-bands and associated channelizations are provided.

In some implementations, the partitioning is performed subject to a maximum FFT size. For example, there may be a maximum FFT size 4096. The maximum FFT size places an upper bound on the number of sub-carriers in a sub-band.

Figure 2:
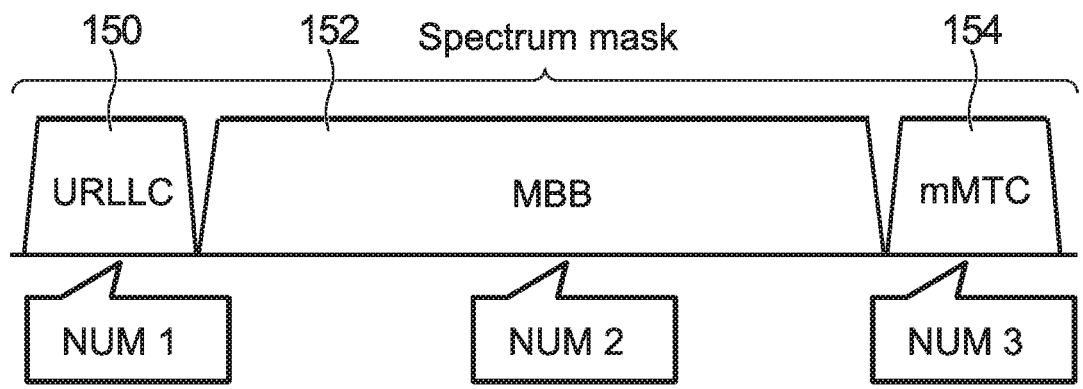
FIG. 2 is an example of sub-band definition.

An example of bandwidth partitioning is depicted in FIG. 2, where the overall bandwidth of a single carrier is divided into first, second and third sub-bands 150,152,154. In the example illustrated, the first sub-band 150 is for URLLC, and uses a first numerology NUM 1. The second sub-band 152 is for eMBB, and uses a second numerology NUM 2. The third sub-band 154 is for mMTC, and uses a third numerology NUM 3.

To communicate with a network, UEs need to be signaled and configured with the sub-bands that UE can support, channelization and resource allocation. Embodiments of the application provide a framework for such configuration from UE perspective.

Figure 3:
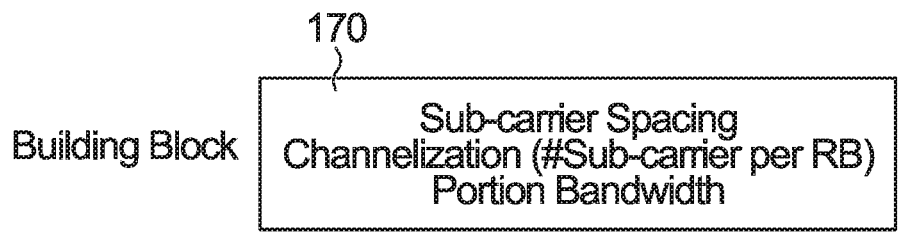
FIG. 3 is an example of a sub-band building block.

In some embodiments, sub-bands (also sub-band partitions and sub-band parts, as indicated previously) are defined using sub-band portions, and the sub-band portions in turn are defined using a sub-band definition framework that relies upon a predefined set of possible sub-band portion properties. Each sub-band portion, as depicted logically in FIG. 3 at 170, has properties including a subcarrier spacing (more generally a numerology), a sub-band portion bandwidth, and optionally a channelization (resource block size). When there is only one portion, then the channelization framework applies to sub-band as a whole. In a specific example, the sub-bands portions have the following possible properties:

Sub-carrier Spacing: 7.5 kHz, 15 kHz, 30 kHz, 60 kHz, 120 kHz

Nominal Resource block size/Channelization N:

The resource block size is a property of the sub-band portion. In some embodiments, N may be constrained to be one of a predetermined set of values, e.g. 3, 4, 6, 8, 12, 16. In some embodiments, N is constrained to be one of a scalable set of values, such as the set {12, 6, 3} or the set {16, 8, 4}

Sub-band portion bandwidth: 1.44 MHz, 2 MHz, 5 MHz, 10 MHz, 20 MHz, 40 MHz, 80 MHz, 100 MHz (other values also possible)

It is expressly contemplated that any suitable values may be set for the above properties and the selection of the above values is purely for the purpose of illustration.

From the UE perspective, in one embodiment, assuming there is only one sub-band portion, the UE receives a configuration of a bandwidth part (equivalently sub-band, bandwidth partition), the configuration comprising at least:
- one of a predefined set of possible numerologies;
- one of a predefined set of possible bandwidth part bandwidths; and
- optionally a resource block size.

In some embodiments the network transmits, and the UE receives, dynamic signaling of the definition of the bandwidth part and a resource block allocation within the defined bandwidth part.

In some embodiments, the network transmits, and the UE receives signaling that semi-statically defines the bandwidth part, and the network transmits, and the UE receives dynamic signaling that allocates resource blocks within the defined bandwidth part. In some embodiments, UE receives dynamic signaling activating one or more defined bandwidth parts and indicating resource blocks allocation within the activated bandwidth parts. Further detailed examples of these scheduling approaches are provided below.

Figure 4:
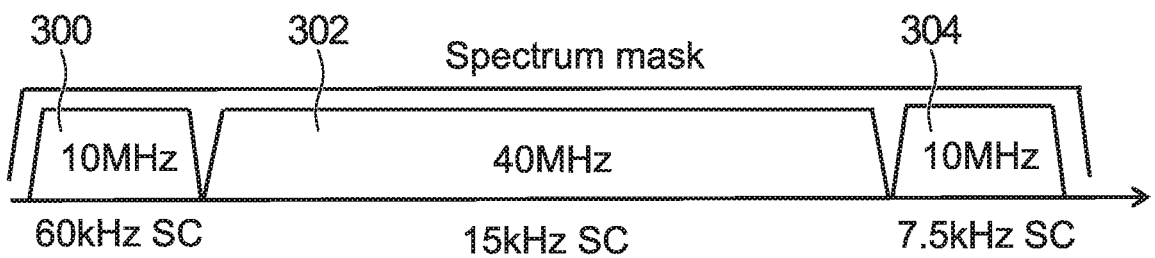
FIG. 4 is another specific example of sub-band definition with specific numerologies consistent with a sub-band definition framework.

A specific example of sub-band definition using these predetermined sets of possible properties is depicted in FIG. 4, although FIG. 4 does not show the details of the channelization. For this example, each sub-band is composed of a single sub-band portion. Channelization examples are detailed below. An overall 60 MHz system bandwidth is divided into first, second and third sub-bands 300,302,304. The first sub-band 300 has a 10 MHz sub-band bandwidth and a 60 kHz sub-carrier spacing (SCS). The second sub-band 302 has a 40 MHz bandwidth and a 15 kHz sub-carrier spacing. The third sub-band 304 has a 10 MHz bandwidth and a 7.5 kHz sub-carrier spacing.

The actual allocation of sub-band bandwidths for different traffic types may be a function of how much traffic/bandwidth is needed for a given traffic type. For example, for a case where sub-band 304 is for mMTC traffic, it may be that only 2 MHz is needed for mMTC traffic rather than the 10 MHz shown in FIG. 4. More generally, for example, sub-bands are defined, such that each sub-band has:
- one of a predefined set of possible sub-carrier spacings;
- at least one sub-band portion, each sub-band portion having:
  a) a channelization in terms of one of a predefined set of possible nominal resource block sizes, with the possible inclusion of a special resource block that is not the nominal resource block size for efficient bandwidth utilization as detailed below; and
  b) one of a predefined set of possible sub-band portion bandwidths.

Various method embodiments of bandwidth allocation will be described using the sub-band definition framework described above. However, it should be understood that these method embodiments can be applied for sub-bands generally, not necessarily defined using the sub-band definition framework described above.

Method 1: Single Numerology for Downlink

Some sub-bands will share one or more edges with the spectrum mask. For example, in the downlink, if a single sub-band for one numerology occupies the entire carrier bandwidth, the sub-band will share two edges with the spectrum mask. A sub-band at the edge of the system bandwidth will share one with the spectrum mask. In such cases, guard bands are defined between the spectrum mask edge and sub-band edge. As a percentage of the sub-band, the guard band can be smaller if the sub-band has a relatively wide bandwidth, and will need to be larger if the sub-band has a relatively narrow bandwidth.

Figure 5A:
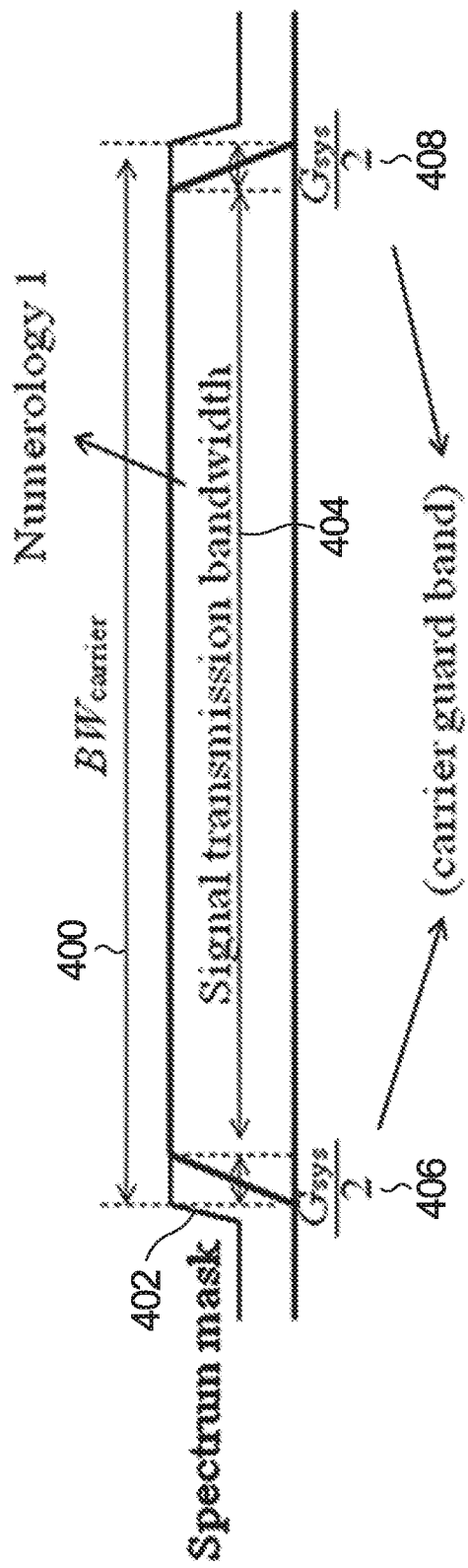
FIG. 5A is a specific example of a single sub-band in a carrier bandwidth.

An example is depicted in FIG. 5A which depicts a carrier bandwidth 400 and associated spectrum mask 402. The sub-band for a single numerology includes signal transmission bandwidth 404 and carrier guardband 406,408.

For a 10 MHz sub-band bandwidth, sub-carrier spacing of 15 kHz, and a fixed channelization N=12, the 10 MHz can accommodate 54 resource blocks, i.e. usage of 648 sub-carriers out of a possible 666 15 kHz sub-carriers. In this case, the unused resources constitute a guardband that occupies 2.7% of the sub-band bandwidth, half of the 2.7% being on each side of the sub-band.

Figure 5B:
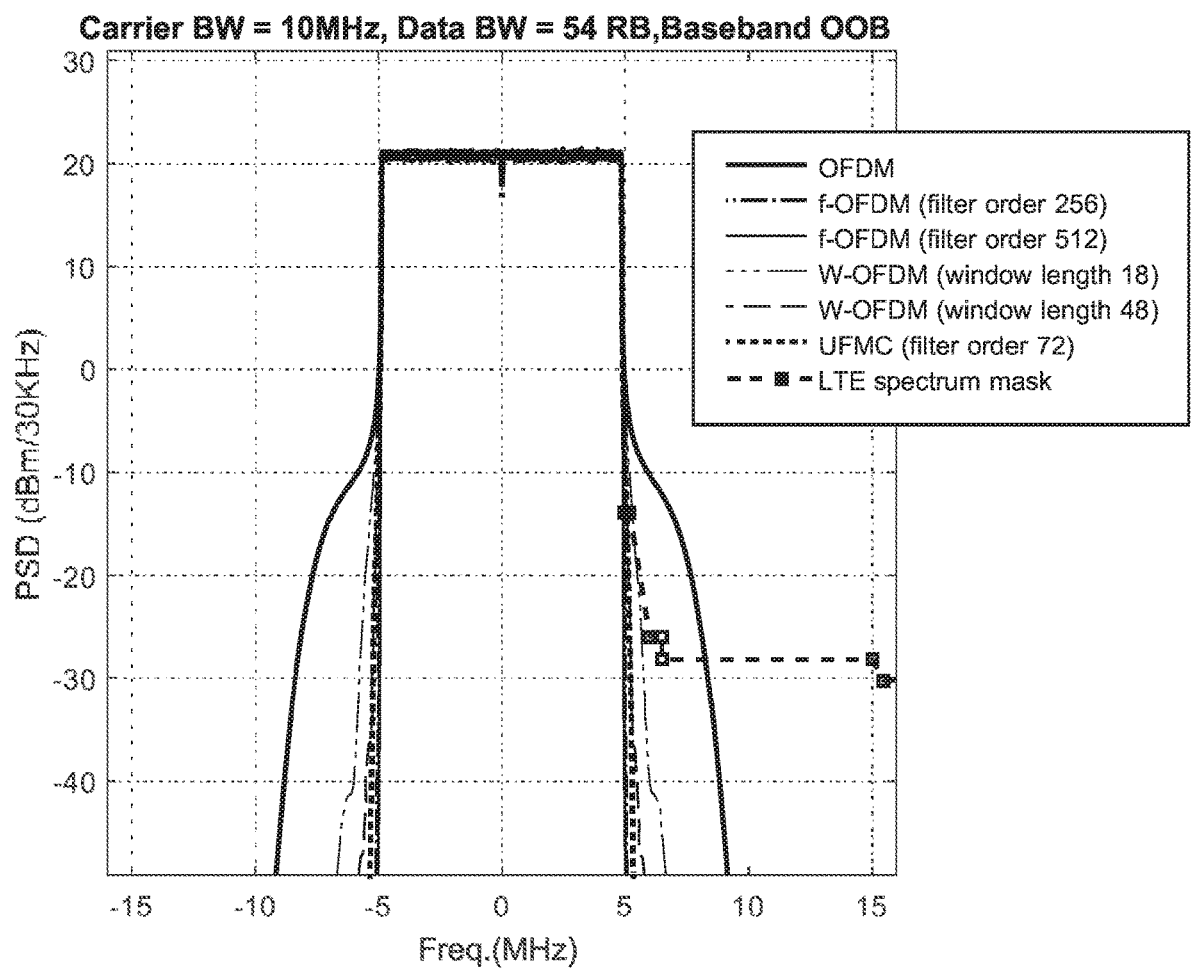
FIGS. 5B and 5C are plots of signal envelopes for various modulation schemes.
Figure 5C:
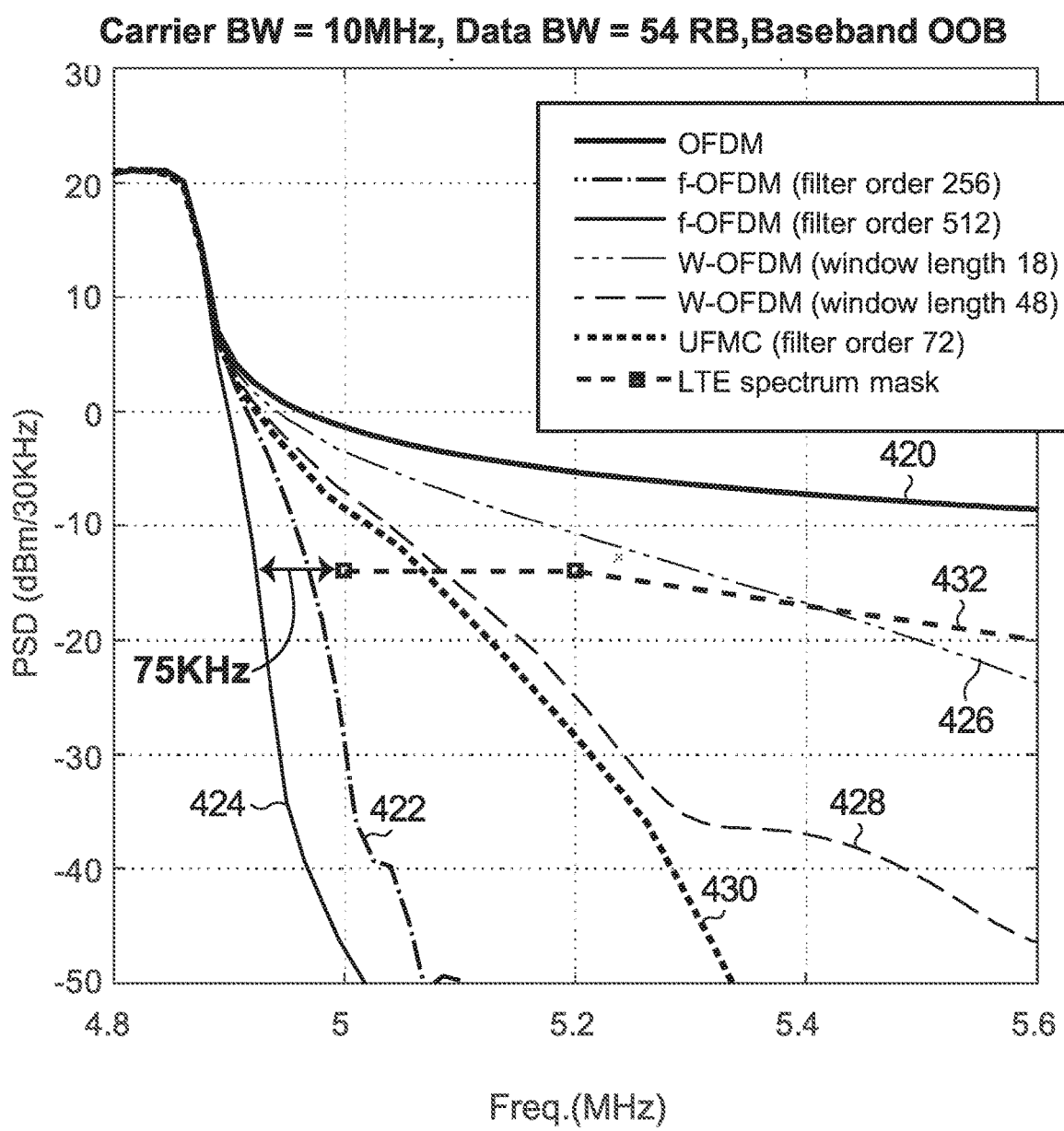

FIG. 5B shows various signal envelopes for a 10 MHz carrier, with a data bandwidth of 54 resource blocks, and FIG. 5C shows a close-up view of the signal envelopes of FIG. 4B around the right edge of the spectrum mask. These signal envelopes are shown at base band, before frequency up-conversion to a carrier frequency. Shown are signal envelopes for OFDM, filtered OFDM (f-OFDM), windowed OFDM (w-OFDM), UFMC (universal filtered multi-carrier), and an LTE spectrum mask as follow, where the numbering is only included in FIG. 5C:
- OFDM: 420
- f-OFDM with filter order 256: 422
- f-OFDM with filter order 512: 424
- w-OFDM with window length 18: 426
- w-OFDM with window length 48: 428
- UFMC with filter order 72: 430
- LTE spectrum mask: 432

With reference to FIG. 5C, as an example of improved bandwidth utilization that can be achieved with a channelization that is not fixed across the entire sub-band, an extra 150 kHz (75 kHz each side) can be used for channelization with filter order 512 with the resulting signal envelope still falling within the LTE spectrum mask. With this approach, 10 more sub-carriers can be used, i.e. 658 out of 666, which leads to 1.2% GB use only, instead of 2.7% with 54 RBs.

The extra 10 sub-carriers can be added to one of the other resource blocks, such that one resource block is a special resource block such as described above, and having 22 sub-carriers in this case. The special resource block approach is described in further detail below with reference to FIG. 9. Alternatively, a special resource block can be defined containing the 10 added sub-carriers. Alternatively a mixed channelization approach can be employed using multiple sub-band portions as discussed above to occupy more of the sub-carriers than can be done with the fixed channelization.

Method 2: Mixed Numerology, with Sub-Bands not at the Edge of Mask

Below, examples of flexible coexistence of multiple numerologies in a carrier are presented. In particular, embodiments are shown that provide for a configurable guard band between adjacent sub-bands of different numerologies. The framework presented below can be used for efficient frequency division multiplexing of numerologies in a carrier.

Figure 6A:
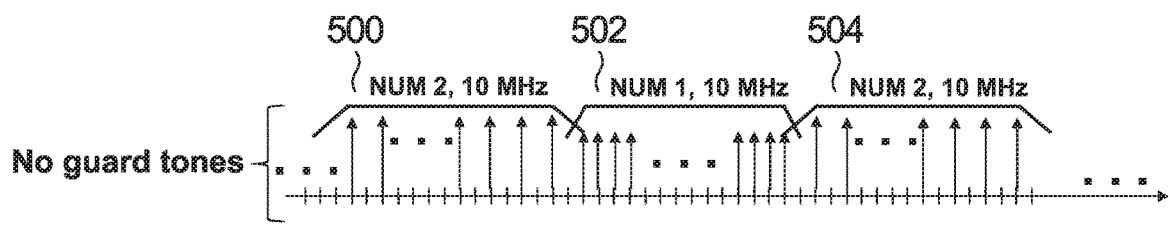
FIGS. 6A, 6B and 6C depict examples of bandwidth utilization when there is no adjacent spectrum mask.

FIG. 6A shows an example where a carrier bandwidth is divided into multiple sub-bands for differing numerologies. Shown is a 10 MHz sub-band 500 for numerology 2 (30 kHz sub-carrier spacing) adjacent to a 10 MHz sub-band 502 for numerology 1 (15 kHz sub-carrier spacing) which is adjacent to a 10 MHz sub-band 504 for numerology 2 (30 kHz sub-carrier spacing). Here, none of the sub-bands share an edge with a spectrum mask (not shown).

For the sub-band 502 for example, the full bandwidth can be exploited as there is no physical constraint on signal envelope. As such, 10 MHz with 15 kHz sub-carrier spacing can accommodate 666 SCs, i.e., 8 more sub-carriers than when a mask is involved.

In this case, for a fixed channelization of 12, the 666 sub-carriers can accommodate 55 resource blocks, using 660 out of 666 sub-carriers. The remaining 6 can function as guard sub-carriers with 3 guard sub-carriers on each side of the sub-band. The guard sub-carriers occupy less than a full resource block in this case.

Alternatively, as in the previous example, the extra 6 sub-carriers can be added to one of the other 55 resource blocks, such that one of the resource blocks is a special resource block having 18 sub-carriers, or a $56^{th}$ resource block can be defined as a special resource block containing 6 sub-carriers.

Figure 6B:
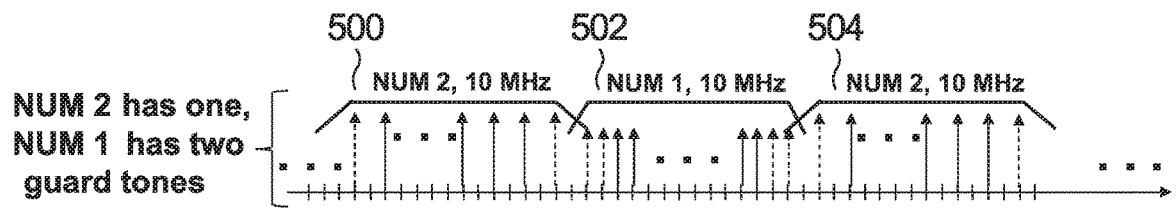

In the example of FIG. 6A, there are no guard sub-carriers; all of the sub-carriers are allocated to data (data sub-carriers shown as solid arrows). In the example of FIG. 6B, numerology 2 has one guard sub-carrier (shown as a dashed arrow) on either edge for both sub-bands 500 and 504, and numerology 1 has two sub-carriers on either edge of sub-band 502.

Method 3: Subcarriers on Grid

Any of the embodiments described herein may employ a guard zone implementation, in which adjacent sub-bands with differing sub-carrier spacings have their sub-carriers on a common grid based on the smallest sub-carrier spacing used by one of the adjacent sub-bands.

Figure 6C:
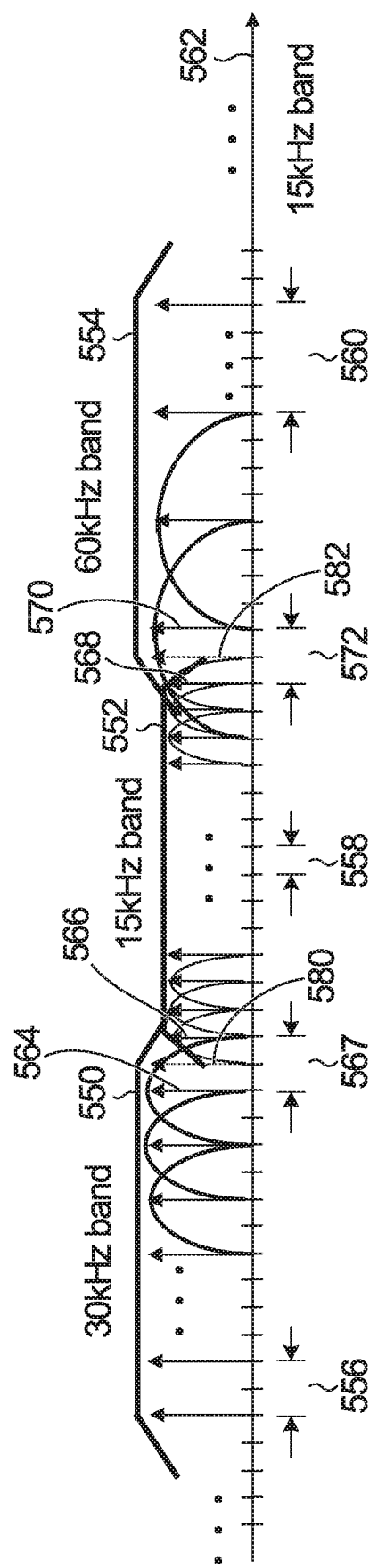

In some such embodiments, the spacing between the highest frequency sub-carrier of a lower frequency band is separated from the lowest frequency sub-carrier of the higher frequency band by an integer multiple of the smallest sub-carrier spacing. An example of the approach will be described with reference to FIG. 6C. Shown are three adjacent sub-bands 550, 552, 554 having respective sub-carrier spacings 556,558,560. In the example of FIG. 6C, the sub-carrier spacing 556 is 30 kHz, the sub-carrier spacing 558 is 15 kHz, and the sub-carrier spacing 560 is 60 kHz. All of the sub-carriers for the three sub-bands 550,552,554 are situated on a grid 562 having a grid spacing equal to the smallest sub-carrier spacing, namely 15 kHz for the example of FIG. 6C.

The spacing between the highest frequency sub-carrier of a lower frequency band and the lowest frequency sub-carrier of a higher frequency band is set to an integer multiple M of the grid spacing, where M≥1. In some embodiments, M is configurable between a defined range M1≤M≤M2. In some embodiments, where the ratio (larger sub-carrier spacing/smaller sub-carrier spacing) is an integer L, M is constrained to the range M1=1≤M≤M2=L. For example, where the sub-carrier spacings are 60 kHz and 15 kHz, the ratio L=4, and M may be constrained to be 1, 2, 3 or 4.

For example, the space 567 between sub-carrier 564 of sub-band 550 and sub-carrier 566 of sub-band 552 is set to a configurable multiple of 15 kHz. In the illustrated example, M=2, and the space 567 is 30 kHz. It is noted that setting M=1 is equivalent to the zero guard sub-carrier embodiment described below with reference to FIGS. 6A and 6B FIG. 2A.

In some embodiments, the spacing is a non-integer multiple of the larger sub-carrier spacing. In some embodiments, the non-integer multiple is less than one.

Similarly, the space 572 between sub-carrier 568 of sub-band 552 and sub-carrier 570 of sub-band 554 is set to a configurable multiple of 15 kHz. In the illustrated example, M=2, and the space 572 is 30 kHz.

In some embodiments, the spacing is a non-integer multiple of the larger of the two sub-carrier spacings used in adjacent sub-bands. In some embodiments the non-integer multiple is less than one. The 30 kHz space 572 between sub-carrier 568 of sub-band 552 and sub-carrier 570 of sub-band 554 is an example of this in that the space is 0.5 times 60 kHz, which is the size of the larger of the two sub-carrier spacings 15 kHz, 60 kHz.

Also shown in dashed lines for comparison purposes are the positions of the highest frequency sub-carrier 580 that would be used in sub-band 550 corresponding to a zero shift and the lowest frequency sub-carrier 582 in sub-band 554 for an inter-band spacing corresponding to a zero shift. It can be seen that the sub-carriers of the sub-band with the larger sub-carrier spacing are shifted away from positions they would occupy with the zero guard sub-carrier by a multiple of the smaller sub-carrier spacing. By shifting the sub-carriers in this way, it may be possible to achieve improved bandwidth utilization. For example, consider a sub-band bandwidth of 10 MHz, with a sub-carrier spacing of 60 kHz. The maximum number of sub-carriers that can be accommodated is floor (10 MHz/60 kHz)=166 sub-carriers, where floor(.) indicates a rounded down integer. The remaining bandwidth of the sub-band corresponding to the fraction of the sub-carrier spacing, 40 kHz in this case, may be allocated to one of the end of the sub-band, and the sub-carrier shifts applied from the other end of the sub-band. If the sub-carriers are now shifted by 15 kHz, the available bandwidth is 10 MHz−15 kHz=9.985 MHz. The maximum number of sub-carriers that can be accommodated is floor (9.985 MHz/60 kHz)=166 sub-carriers. In other words, shifting the sub-carriers by 15 kHz does not affect the capacity of the sub-band. If instead an entire sub-carrier was reserved for as a guard sub-carrier, then the maximum number of sub-carriers that could be accommodated is 165. The size of the remaining bandwidth corresponding to the fractional sub-carrier represents the maximum shift that can be performed without reducing the number of usable sub-carriers. For example, if the remaining bandwidth is 40 kHz, then a shift of 15 or 30 kHz will not affect the capacity of the sub-band. However, a shift of 45 kHz will cause the 166th sub-carrier to fall outside the 10 MHz sub-band, resulting in only 165 available sub-carriers. A further shift equal to the sub-carrier spacing (60 kHz in this example) will further reduce the capacity of the sub-band by one additional sub-carrier.

In some embodiments, signaling is used to indicate a shift in the sub-carrier location within a sub-band on the grid, or equivalently, to indicate a spacing between adjacent sub-carriers of two sub-bands in units of the smaller sub-carrier spacing. For example, two bits can be used to indicate a shift of zero, one, two, or three times the grid spacing, which equivalently indicates a spacing of one, two, three or four times the grid spacing.

For example, if the shift is a multiple of 12 times the grid spacing and a channelization is adopted with N=12 (resource block size is 12 sub-carriers), then the shift amounts to the equivalent bandwidth of one resource block of the grid sub-carrier spacing. If the shift is a multiple of 48 times the grid spacing, then this amounts to the equivalent bandwidth of a resource block having a sub-carrier spacing that is 4 times the sub-carrier spacing of the grid.

Where there is no change in the number of sub-carriers as a result of implementing a shift, as per the above example, this approach has no effect on scheduling or capacity. In some embodiments, as a result of the shift, a smaller maximum number of sub-carriers can be accommodated in the sub-band.

In some embodiments:
the sub-carriers of multiple sub-bands all lie on a grid with a spacing equal to the smallest sub-carrier spacing;
a spacing is defined between the highest frequency sub-carrier of one sub-band and the lowest frequency sub-carrier of an adjacent sub-band that is a multiple of the smallest sub-carrier spacing; and
resource blocks are defined that take into account the defined spacing.

From a channelization perspective, in some embodiments the multiple indicates a spacing between a highest frequency sub-carrier of a right-most resource block in one sub-band, and a lowest frequency sub-carrier of a left-most resource block in the adjacent sub-band.

When the multiple is one, the highest frequency sub-carrier of a right-most resource block and the lowest frequency sub-carrier of the left-most resource block in the adjacent sub-band are at consecutive locations on the grid.

Figure 6D:
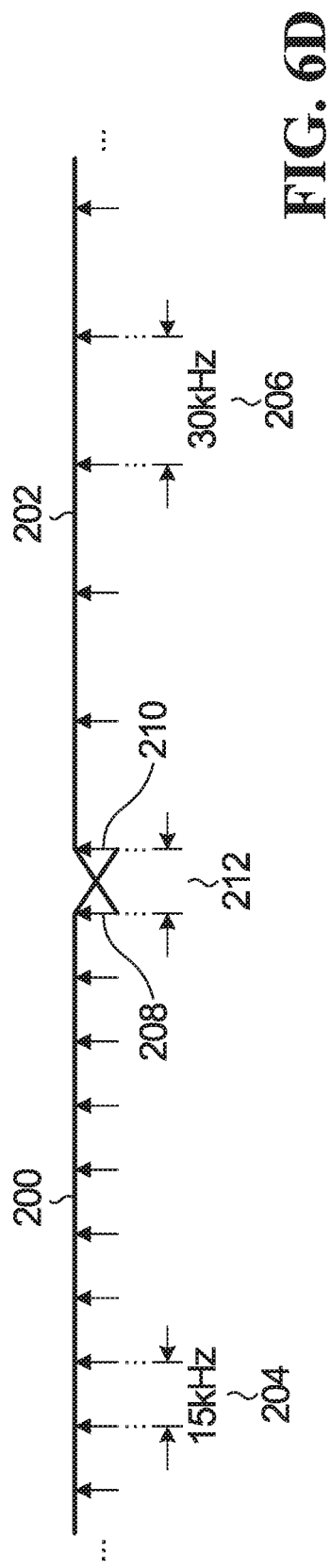
FIGS. 6D and 6E depict examples of bandwidth utilization with zero guard sub-carriers.

Two examples are shown in FIG. 6D, generally indicated at 600 and 602. In both examples, there is a first sub-band with 15 KHz sub-carrier spacing and a second sub-band with 30 kHz sub-carrier spacing, but the same approach is applicable for any pair of adjacent sub-bands with respective sub-carrier spacings, with sub-carrier locations in both sub-bands being situated on a grid with a spacing equal to the smaller sub-carrier spacing. For both examples, RBs in any sub-band contain 4 sub-carriers, but the same approach can be applied for RBs of any size. Sub-carriers in both sub-bands are on a 15 kHz grid.

For the 30 kHz numerology, the RB bandwidth is 120 kHz. If the sub-band bandwidth is 1.4 MHz, then 46 tones of the 30 kHz numerology can be contained within the sub-band out of which 44 (i.e. 11 RBs) can be used as useful sub-carriers in the case that each RB has 4 sub-carriers. The position of the first useful sub-carrier is configurable as a function of a shift, which is an integer multiple of the grid spacing.

In the first example 600, M=1, so the first 30 kHz sub-carrier is located in the first position on the grid within the sub-band. Channelization in the second sub-band starts with that first sub-carrier, and the first RB in the second sub-band is indicated at 604.

In the second example 602, M=2, so the first 30 kHz sub-carrier is located in the second position on the grid within the sub-band. Channelization in the second sub-band starts with the first 30 kHz sub-carrier, and the first RB in the second sub-band is indicated at 608.

In some embodiments, the described approach is combined with a scheduling-based approach (detailed below) to selecting sub-carriers in a sub-band. A guard sub-carrier is defined by not scheduling the sub-carrier. With the combined approach, to begin, signaling is used to indicate a shift in the sub-carrier location relative to a grid as discussed above. In a specific example, a given sub-band accommodates a maximum of N sub-carriers with a sub-carrier spacing of W kHz. After the shift, there may be still N sub-carriers or fewer than N sub-carriers. A scheduling-based approach is employed to expand the guard zone beyond the maximum that can be achieved with the shift approach. This guard zone expansion can be performed dynamically as a function of whether the edge sub-carriers in the adjacent sub-band are being used for a given scheduling interval, for example. In a specific example, scheduling is used to indicate that P edge sub-carriers of the available shifted sub-carriers are used as part of a guard zone. The number of sub-carriers available for data then would be the difference between N and P, namely N-P, if the sub-carrier shift did not reduce the available number of sub-carriers, or one fewer than the difference between N and P, namely N-1-P, if the sub-carrier shift reduced the available number of sub-carriers by one.

In some embodiments, the space between the highest frequency sub-carrier of one sub-band and the lowest frequency sub-carrier of a neighboring sub-band is a combination of the space allowed for by the shift amount and the space allowed for by scheduling guard sub-carriers. In a specific example, where neighboring sub-bands employ 15 kHz and 60 kHz sub-carrier spacings, a 75 kHz space between the highest 15 kHz sub-carrier used for data and the lowest 60 kHz sub-carrier used for data can be achieved by scheduling on 60 kHz sub-carrier as a guard tone, and setting M=1 indicating a 15 kHz shift.

In some embodiments, signaling, for example in the form of a bitmap, is used to indicate which sub-carriers are being used for data. In some implementations, an N-bit bitmap is used to allow the arbitrary selection of any of the N subcarriers. If guard sub-carriers are defined, the scheduler does not schedule data on the guard sub-carriers. The receiver does not necessarily need to know that the guard sub-carriers are guard sub-carriers, but rather simply needs to know it does not have data on those sub-carriers. In some embodiments, the signaling used to indicate the shift may be sent to the receiver together with the signaling used to indicate which sub-carriers are being used for data, for example in a control channel. In other embodiments, the signaling used to indicate the shift may be sent separately, for example during an initial access procedure.

In some embodiments, if the number of sub-carriers available is reduced due to the shift, a smaller bitmap reflecting the actual number of sub-carriers available can be used.

In another embodiment, some maximum number K of edge subcarriers is reservable for guard zone purposes, a bitmap of K bits (or other signaling) is used to signal which of the K sub-carriers, starting from the edge of the sub-band are reserved as guard sub-carriers, and the remaining sub-carriers are available for transmitting data. For example, in the case where there is a maximum of one guard sub-carrier, a single bit can be used to indicate whether the single sub-carrier is a guard sub-carrier or not. In another example, $\log_2 K$ bits can be used to signal how many of the K sub-carriers, starting from the edge of the sub-band, are reserved as guard sub-carriers, the remaining sub-carriers being available for data.

In a specific example, the signaling for the shift is sent semi-statically, whereas the signaling to convey which sub-carriers are reserved as guard sub-carriers is sent dynamically as part of dynamic scheduling information.

In some embodiments, for a given sub-band, the available carrier bandwidth accounting for the shift discussed above is divided into a plurality of resource blocks. Each resource block occupies a set of sub-carriers in the frequency domain. On the uplink, scheduling is used to assign specific user equipment (UEs) to transmit on specified resource blocks for uplink transmission. In some implementations, this resource block assignment can be done persistently or dynamically, and may involve signaling to the UE that identifies what resource blocks to use. Similarly, on the downlink, scheduling is used to assign specific RBs for use in transmitting to particular UEs. In some implementations, this can be persistent or dynamic.

In some embodiments, the size of the guard zones is based on transmitter frequency localization capabilities. A relatively smaller guard zone can be implemented for a transmitter with better frequency localization.

In some embodiments, absent frequency localization features, such as f-OFDM or W-OFDM, a guard band is required between any two adjacent sub-bands, and between two neighboring carrier bands. For a given UE, the UE may or may not support frequency localization features.

In some embodiments, a UE is configured to communicate its frequency localization capability to the network, for example to a TRP. This might, for example, occur during initial system access. This enables the network to determine the UE configuration, and based in part on that, to determine if a guard band is required or not, and the size of the guard band if required.

In some embodiments, for a UE with an f-OFDM capability that is configured to use the f-OFDM capability, no guard band is required at all.

In some embodiments, for a UE with W-OFDM capability that is configured to use the W-OFDM capability, a guard band is required.

In some embodiments, for a UE that either has neither capability (or more generally has no frequency localization functionality), and/or that has the capability but is not configured to use it, a guard band will be required, typically larger than that required for W-OFDM.

In some embodiments, whether or not guard sub-carriers are allocated in a given sub-band is determined as a function of the modulation and coding scheme (MCS) used near the sub-band edge. For example, in the case of high MCS, several guard sub-carriers are allocated at the edge of the sub-band, whereas for a low MCS all sub-carriers can be used for data.

For any of the embodiments described herein, in one variant, each sub-band may be scheduled independently, for example using separate bitmaps. For the example of FIG. 6A, resource blocks within sub-bands 500,502,504 are scheduled independently. In another variant, where there are multiple sub-bands allocated to the same numerology, the multiple numerologies can be scheduled together, for example using one bitmap. For the example of FIG. 6A, sub-bands 500,504 each operate using numerology 2, and are scheduled together.

Method 4: Zero Guard Tone Solution

Another embodiment of the disclosure provides a zero guard sub-carrier embodiment, in which no space is reserved between adjacent edge sub-carriers of adjacent sub-bands. A given sub-band assigned to a given sub-carrier spacing defines a range of frequency available for sub-carriers with that spacing. A first example of the approach will be described with reference to FIG. 6D, A lower frequency sub-band 200 accommodates a set of sub-carriers with a first sub-carrier spacing 204, and an adjacent higher frequency sub-band 202 accommodates a set of sub-carriers with a second sub-carrier spacing 206. In the example of FIG. 6D, the first sub-carrier spacing is 15 kHz, and the second sub-carrier spacing is 30 kHz. The space between the highest frequency sub-carrier 208 of the lower frequency sub-band 200 and the lowest frequency sub-carrier 210 of the higher frequency sub-band 202 is indicated at 212. According to an embodiment of the disclosure, the space 212 is set to the smaller of the two sub-carrier spacings 204,206 of the adjacent sub-bands 200,202. Thus, in the example of FIG. 2A, the space 212 is set to 15 kHz.

Figure 6E:
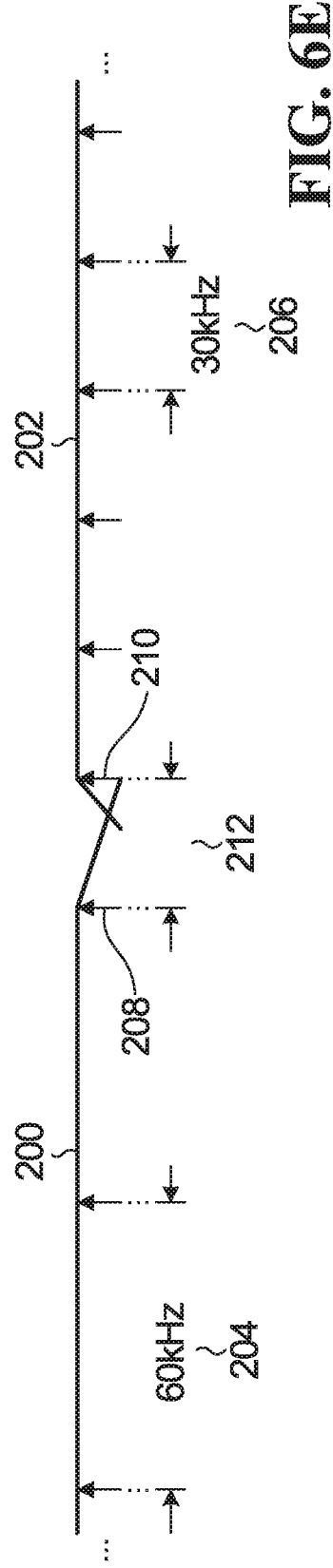
Figure 6F:
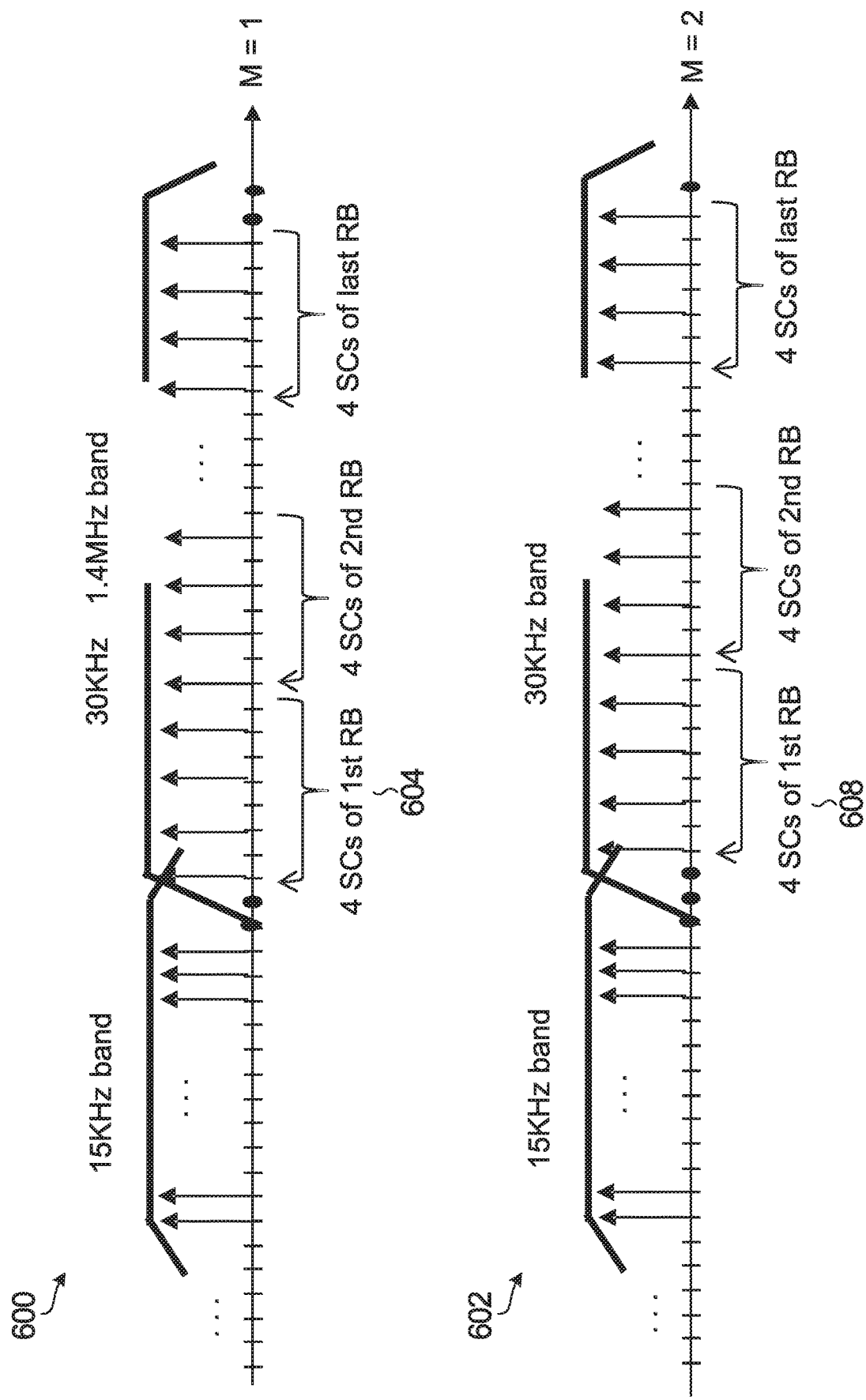
FIG. 6F shows two examples where M=1 and M=2 respectively.

Another example is depicted in FIG. 6E, where the first sub-carrier spacing 204 is 60 kHz, and the second sub-carrier 206 spacing is 30 kHz. The space between the highest frequency sub-carrier 208 of the lower frequency sub-band 200 and the lowest frequency sub-carrier 210 of the higher frequency sub-band 202 is indicated at 212, and is set to the smaller of the two sub-carrier spacings 204,206 of the adjacent sub-bands 200,202, namely 30 kHz.

The examples of FIGS. 6D and 6E are referred to herein as zero guard sub-carrier implementations, because adjacent sub-carriers at the edges of the two adjacent sub-bands have the same spacing as adjacent sub-carriers of the sub-band with the smaller sub-carrier spacing, with no additional space being inserted. With a zero guard sub-carrier implementation, there will be some interference due to overlap in the spectrum of the highest frequency sub-carrier of the lower frequency band, and the lowest frequency sub-carrier of the higher frequency band. This interference may or may not be significant depending on the power and the modulation and coding scheme (MCS) applied to the sub-carriers at the edge of the sub-bands.

Method 5: Mixed Numerology with Sub-Bands that Share the Edge of Spectral Mask

Figure 7A:
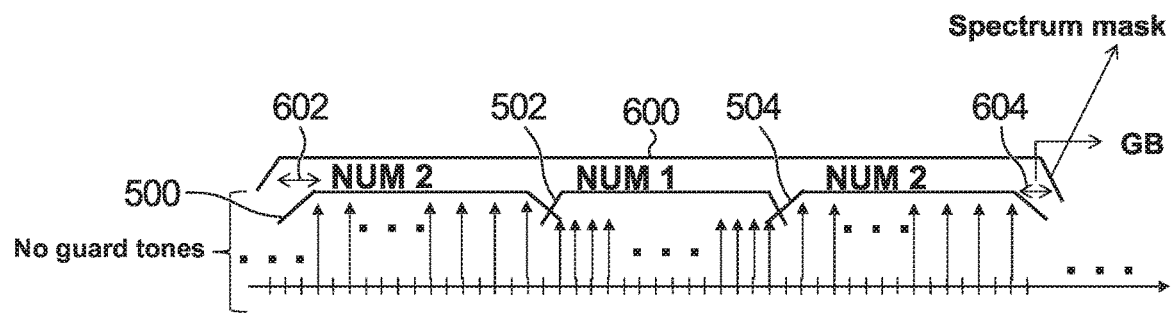
FIGS. 7A and 7B depict examples of bandwidth utilization when there is an adjacent spectrum mask.

In the example of FIG. 7A, there are again three sub-bands 500,502,504 as described previously. In this case, also shown is a spectral mask 600. Sub-bands 500 and 504 each share an edge with the spectral mask 600. Guard bands 602,604 are defined between sub-bands 500,504 and the spectral mask 600. For the example of FIG. 7A, there are no guard sub-carriers defined within the sub-band bandwidths, and the entire sub-band bandwidths can be used for data. In other words, the sub-band bandwidth is defined or obtained after leaving out any necessary guard band at the edge with the mask. Then, the entire defined sub-band bandwidth can be used for data.

For numerology 2, if the entire 10 MHz were available for data (i.e. case where there is no adjacency with spectrum mask), there would be room for 666 sub-carriers in the combination of sub-bands 500,504. For a combination of two sub-bands for a numerology that are both adjacent to the spectrum mask, e.g. sub-bands 500,504, if the same 10 MHz is to be allocated to a sub-band and a 0.6% guard band (i.e. guard bands 502,504), the bandwidth available for data is 9.94 MHz, and this leaves 662 sub-carriers available for data.

Figure 7B:
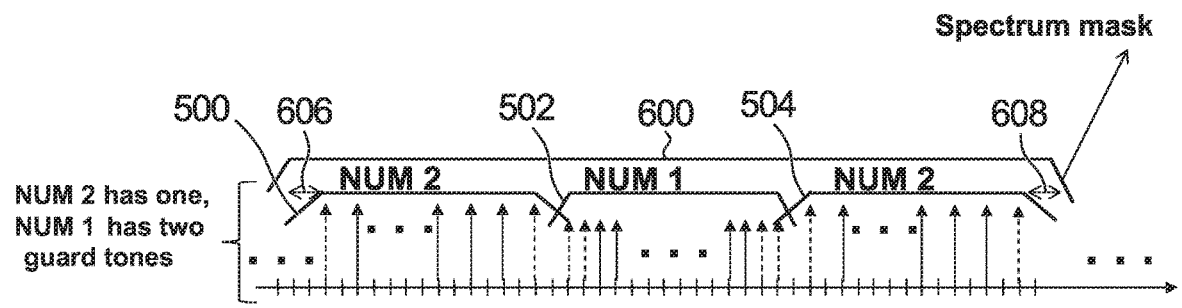

In case of high MCS, few guard tones can be used between edge of sub-bands. An example of this is shown in FIG. 7B, which differs from the example of FIG. 7A in that sub-bands 500,504 each have one guard subcarrier on each sub-band edge, and sub-band 502 has two guard sub-carriers on each sub-band edge. In another embodiment, guard sub-carriers can be assymetrically allocated as between the two edges of a sub-band. For example, guard sub-carriers are defined at sub-band edges where adjacent with another sub-band, but not at sub-band edges where adjacent with a spectral mask. Applying this to the example of FIG. 7B, guard sub-bands would be defined within the sub-bands 500,504 for numerology NUM2 where each sub-band 500, 504 is adjacent with another sub-band, i.e adjacent with sub-band 502, but no guard-sub-carriers are defined where the sub-band edge is adjacent to the mask edge. Because guard bands 606 and 608 have already been defined for separation between the sub-band and the spectrum mask, additional guard sub-carriers may not be needed between mask and sub-band edge.

As detailed above in the examples, using fixed channelization may not always result in maximum bandwidth utilization. Two different approaches have been described to increase and in some cases maximize utilization. These two approaches will now be described in some further detail.

Mixed Channelization

Embodiments are presented which consider the case when a UE receives/transmits data with mixed channelization, i.e., at least two channelizations are used for data transmission over the used sub-bands. Mixed channelization can be useful for efficient spectrum utilization, as it allows close to 100% of sub-band bandwidth utilization.

Figure 8A:
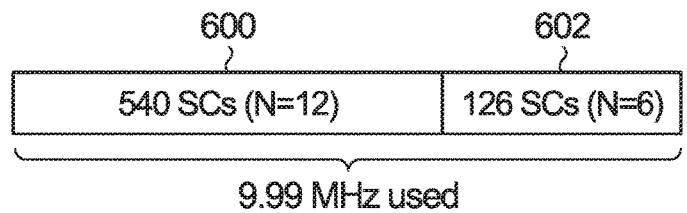
FIG. 8A is an example of mixed channelization within two sub-band portions of a sub-band.
Figure 8B:
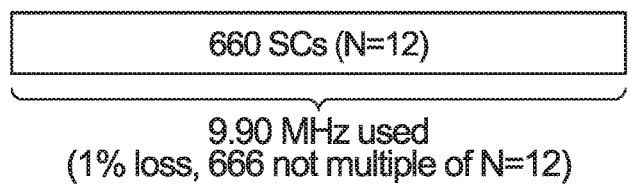
FIG. 8B shows bandwidth utilization with a fixed channelization.

In the approach referred to previously as mixed channelization, the sub-band bandwidth is divided into sub-band portions, and the sub-carriers within each sub-band portion are grouped into different resource block sizes. As a specific example, if 666 sub-carriers is the maximum number of sub-carriers that can be used for a 10 MHz sub-band, these can be divided into two groups (logically) based on N=6, 12, although other combinations are possible depending an allowable set of values for N. An example is shown FIG. 8A which shows 540 SCs 600 grouped in 45 resource blocks with N=12 and 126 SCs 602 grouped in 21 resource blocks with N=6. In this case, all 666 sub-carriers are used, and maximum utilization is achieved. This can be contrasted with the situation where only 660 sub-carriers are used with a fixed channelization as shown in FIG. 8B. Compared to the case in FIG. 8B where only 9.9 MHz can be used, mixed channelization considered in FIG. 8A allows for using 9.99 MHz out of available 10 MHz.

So long as transmitter and receiver are aware of the channelization, any suitable signaling can be employed. For example, there can be single bitmap with containing a bit for each resource block, whatever its size. In this case, for the example of FIG. 8A, a bitmap with 66 bits would suffice. Alternatively, a bitmap with two fields could be employed. The first field identifies the channelization region (N=6 vs. N=12), and the second field is a bitmap of resource blocks within that channelization region.

Formation of Special Resource Block

Figure 9:
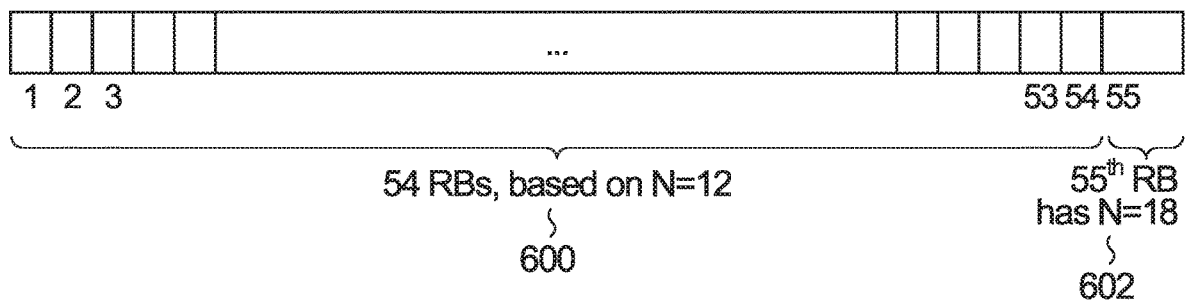
FIG. 9 shows bandwidth utilization with a special resource block having a different number of sub-carriers.

In another approach referred to above, a special resource block is formed that has a size different from the rest of the resource blocks in the sub-band. The special resource block can be formed to observe the minimum guard band and occupy all possible sub-carriers. For example, in a 10 MHz sub-band, there can be 55 RBs based on N=12 which occupy 660 SCs. To ensure all 666 SCs are utilized, one of the resource blocks can be defined to be a larger resource block with N=18. Then, the resulting overall channelization is shown in FIG. 9 and includes 54 resource blocks 600 with N=12 and one resource block 602 with N=18. The special resource block in this example is defined at the edge of the sub-band, but this need not be the case, so long as transmitter and receiver are aware of the channelization.

If the total number of resource blocks (for example 55) is unchanged after implementing the special resource block, the same bit map can be used to signal the 55 resource blocks (including one special resource block) as would be used for 55 identically sized resource blocks. The special resource block can be smaller or bigger than regular resource blocks of a sub-band.

In the embodiments described, the special/additional resource block definition is provided to enable usage of the maximum portion of an available bandwidth. In some embodiments, a special RB (in this case, the special RB is a fraction of whole RB) can also be defined which can be used as a guard band at the edge of sub-band. For example, if for 15 kHz sub-carrier spacing, an N=12 sub-carrier resource block definition is used in a 20 MHz band, then the maximum number of resource blocks that can be used is 111 which is 19.98 MHz. This leaves about only 0.02 MHz which is unusable if fixed N=12 definition is used. If a guard band more than this is needed, then a special RB (e.g., size below N=12) can be formed by puncturing a regular RB or rate matching the information in the remaining RBs and that special RB can be used to serve for additional guard. In this case whatever bandwidth is left after defining the set of normal size resource blocks, and the special resource block, is the guard band Applying this approach to the above-introduced example in which N=12, with a 15 kHz sub-carrier spacing, and 20 MHz sub-band bandwidth. The bandwidth can be divided into 110 RBs of size N=12, and an 111$^{th}$ RB of size 6. Note that 1333 is the maximum number of sub-carriers that can be used for 15 k sub-carrier spacing and 20 MHz. With this example 110×12+6=1326 sub-carriers are used (110 grouped as N=12, one used as fractional RB), and remaining 7 sub-carriers are left out for guard band, and not considered as part of RB scheduling. In this example, the bandwidth of the guard band is less than a single RB.

Specific Channelization Example for Mixed Numerology

A specific channelization example will now be described for the mixed numerology case described previously with reference to FIG. 4:

a) The first sub-band 300 is a 10 MHz URLLC band. 10 MHz based on a 60 kHz sub-carrier spacing results in 165 useful subcarriers accounting for 1% left at the edge. Fixed channelization with N=12 results in 13 RB and 9 guard tones, and fixed channelization with N=6 gives 27 RB, 3 guard tones. A zero guard tone solution is achieved through the use of a special resource block containing 9 sub-carriers: 13 RBs with N=12, 1 RB with N=9.

b) The second sub-band 302 is a 40 MHz MBB band. 40 MHz based on a 15 KHz sub-carrier spacing results in 2666 useful sub-carriers. Fixed channelization with N=12 results in 222 resource blocks occupying all but 2 of the useful sub-carriers representing utilization of 39.96 MHz with 0.1% unused. Optionally, a special resource block can be defined with 14 sub-carriers such that all the sub-carriers are used.

c) The third sub-band 304 is a 10 MHz mMTC band. 10 MHz based on a 7.5 kHz sub-carrier spacing results in 1320 useful sub-carriers accounting for 1% left at the edge. Fixed channelization with N=12 results in 110 resource blocks occupying all of the 1320 useful sub-carriers. With this approach, a total of 59.75 MHz out of 60 MHz are used.

Scheduling

In some embodiments, having defined resource blocks using one of the method summarized above, or described herein, the method further involves scheduling using the different resource block sizes thus defined. The scheduling units can include the regular resource block (e.g. with N=12) and the special resource block that is larger or smaller (e.g. larger or smaller than 12). Options of scheduling using more than two resource block sizes are not precluded.

In some embodiments, the method also includes scheduling over a group of RBs (i.e., different scheduled BWs), where the group may consist of regular RBs, regular RBs and special RBs, or special RBs only. For example, a group may contain 1) P regular RBs, P=1, 2, 3, 4, 5, 6 etc. 2) Q regular RBs, Q=1, 2, 3, 4, 5 etc. and L special RBs, L=1, 2 etc., 3) K special RBs, where K=1, 2, 3, 4, etc.

For any of the embodiments described herein, the method may also include signaling to indicate the scheduling. This may, for example involve:
1) transmitting a dynamic indication of the scheduling in grant signaling, where scheduling may include information of sub-band and RB allocation (both regular and special RB);
2) semi-static indication of scheduling; for example, some part of guard band can be semi-statically configured and a semi-static configuration for special resource block can be used, and size of special resource block may not be dynamically updated;
3) scenario dependent—scheduling information that depends on factors such carrier frequency and corresponding bandwidth, service (application) and location of the scheduled bandwidth (e.g. band edge). The sub-band definition or building block, minimum scheduling unit or special resource block size can be different based on one or a combination of these factors;
4) Cross-carrier scheduling, i.e., scheduling may include information that is valid for data transmission over more than one carrier. For example, in some cases, cross-carrier scheduling can be adopted for transmission to/from a UE and scheduling information may contain common information regarding that transmission over multiple carriers. As an example, a UE may use 10 RB data at the edge of a bandwidth of two different carriers, however, the guard band at the edge needed to be reserved can be different for different carriers (one carrier may have a bandwidth of 10 MHz, another may have a bandwidth of 80 MHz).

It is noted the approaches described herein can be applied for uplink transmission or downlink transmissions, or both uplink and downlink transmissions. In addition, these approaches can be used with frequency division duplex and time division duplex (unidirectional and bidirectional) configurations.

Referring now to FIG. 10A, shown is a simplified diagram of part of a transmitter that can be used to perform transmission as described above, or a base station that can operate using multiple numerologies with multiple sub-band portions and mixed channelizations or special resource blocks as defined above. In this example, there are L supported numerologies, where L>=2, each numerology operating over a respective sub-band with a respective sub-carrier spacing. However, the approaches described herein can also be applied when there is only a single numerology.

For each numerology, there is a respective transmit chain 900, 902. FIG. 10A shows simplified functionality for the first and Lth numerology; the functionality for other numerologies would be similar. Also shown in FIG. 10B is simplified functionality for a receive chain 903 for a receiver operating using the first numerology.

The transmit chain 900 for the first numerology includes a constellation mapper 910, sub-carrier mapping and grouping block 911, IFFT 912 with sub-carrier spacing $SC_1$, pilot symbol and cyclic prefix insertion 914, and frequency localization operator 916 (for example filtering, sub-band filtering, windowing, sub-band windowing). Also shown is a scheduler 950 that performs scheduling. It is noted that depending on the frequency localization operator implementation, different guard zones may be needed at the two edges of the spectrum and/or between sub-bands with different numerologies (i.e. different sub-carrier spacings). In some embodiments, the guard zones are determined taking into account frequency localization capabilities of both the transmitter and receiver.

For embodiments in which the same numerology uses multiple distributed sub-bands (for example sub-bands 602, 604 of FIG. 7A), these sub-bands can be generated in distinct transmit chains operating with the same sub-carrier spacing, or alternatively, the frequency localization operator may comprise multiple shifting and filtering operators that shift each sub-band to the appropriate location and apply any needed filtering.

In operation, constellation mapper 910 receives UE data (more generally, UE content containing data and/or signalling) for $K_1$ UEs, where $K_1>=1$. The constellation mapper 910 maps the UE data for each of the $K_1$ UEs to a respective stream of constellation symbols and outputs this at 920. The number of UE bits per symbol depends on the particular constellation employed by the constellation mapper 910. In the example of quadrature amplitude modulation (QAM), 2 bits from for each UE are mapped to a respective QAM symbol.

For each OFDM symbol period, the sub-carrier mapping and grouping block 911 groups and maps the constellation symbols produced by the constellation mapper 910 to up to P inputs of the IFFT 912 at 922. The grouping and mapping is performed based on scheduler information, which in turn is based on a TDD frame structure such as describe above, in accordance with a defined resource block definition and allocation for the content of the $K_1$ UEs being processed in transmit chain 900. P is the size of the IFFT 912. Not all of the P inputs are necessarily used for each OFDM symbol period. The IFFT 912 receives up to P symbols, and outputs P time domain samples at 924. Following this, in some implementations, time domain pilot symbols are inserted and a cyclic prefix is added in block 914. The frequency localization operator 916 may, for example, apply a filter $f_1(n)$ which limits the spectrum at the output of the transmit chain 900 to prevent interference with the outputs of other transmit chains such as transmit chain 902. The frequency localization operator 916 also performs shifting of each sub-band to its assigned frequency location.

The functionality of the other transmit chains, such as transmit chain 902 is similar. The outputs of all of the transmit chains are combined in a combiner 904 before transmission on the channel.

For embodiments featuring the configurable shift described above, a shift controller 960 is provided that produces an output 962 for the frequency localization operator 916 indicating how much to shift the sub-carriers. In some embodiments, the zero guard sub-carrier embodiment is implemented and there is no need for the shift controller if that is statically defined. The frequency localization operator 916 implements the shift of the sub-carriers within a sub-band by a multiple of the grid spacing, as detailed above, based on an output from the shift controller 960. The shift can be implemented by the frequency localization operator 916 as part of an upconversion from baseband to radio frequency. In this case, the scheduler 950 that performs scheduling using one of the methods described herein, for example the method of FIG. 11 described below, based on a channelization that occupies the entire sub-band bandwidths, or the entire sub-band bandwidth less the shift amount, with scheduling used to implement any required guard zones above and beyond the shift amount. It is noted that depending on the frequency localization operator implementation, different shifts and scheduled guard zones may be needed at the two edges of the spectrum and/or between sub-bands with different numerologies (i.e. different sub-carrier spacings). In some embodiments, the guard zones are determined taking into account frequency localization capabilities of both the transmitter and receiver.

For embodiments in which the guard zone is implemented through scheduling, the scheduler 950 implements the scheduled guard zone by not mapping to the required guard sub-carriers. The scheduler maps to the number of remaining subcarriers possible accounting for the shift if present, and accounting for the required guard sub-carriers.

Signalling conveying the shift is transmitted to the UEs. In some embodiments, this is done during connection setup. In other embodiments, it is sent from time to time whenever it is necessary to convey a change in the shift. Alternatively, it is sent with a fixed periodicity. If the signalling for the shift is sent using resources on the sub-band whose sub-carriers are being shifted, the signalling needs to be sent in advance so that the receiver can function properly. In addition, scheduling information is sent on the downlink that allows a receiver to determine where its resources are located, accounting for the guard sub-carriers if any.

FIG. 10B shows a simplified block diagram of a receive chain of a base station receiving using a first numerology depicted at 903. This functionality would be replicated where multiple numerologies are supported. The receive chain 903 includes frequency localization operator 930, cyclic prefix deletion and pilot symbol processing 932, fast Fourier transform (FFT) 934, sub-carrier de-mapping 936 and equalizer 938. Each element in the receive chain performs corresponding reverse operations to those performed in the transmit chain. The sub-carrier de-mapper 936 also makes use of scheduler information based on channelization and resource block assignment.

For embodiments featuring the shift and/or scheduled guard sub-carriers, the frequency localization operator 930 operates based on information indicating the shift. The frequency localization operator applies the shift amount to the sub-carriers in units of the grid spacing referred to previously. The scheduling information, which indicates how many sub-carriers are reserved as guard sub-carriers, and/or which indicates which sub-carriers are allocated to which UE for uplink transmission, is received and acted upon by the subcarrier de-mapper 936. The transmit chain of a UE may be similar to that of a base station although there would be no scheduler. The receive chain of a UE may be similar to that of a base station. The UE would receive the shift and scheduling information as signalling. Note that multiple UEs may operate (for reception and/or transmission) using the same numerology, but with each UE operating on a different sub-band. The frequency localization operation in each UE moves the sub-band to the required location.

Figure 11A:
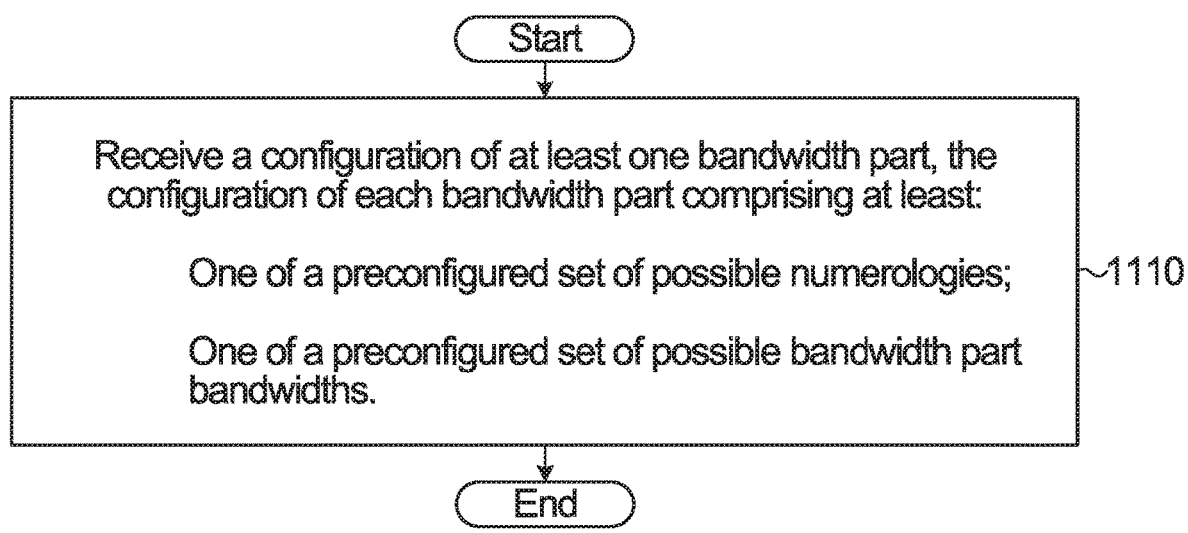
FIG. 11A is a flowchart of a method of receiving a configuration of a bandwidth part.
Figure 11B:
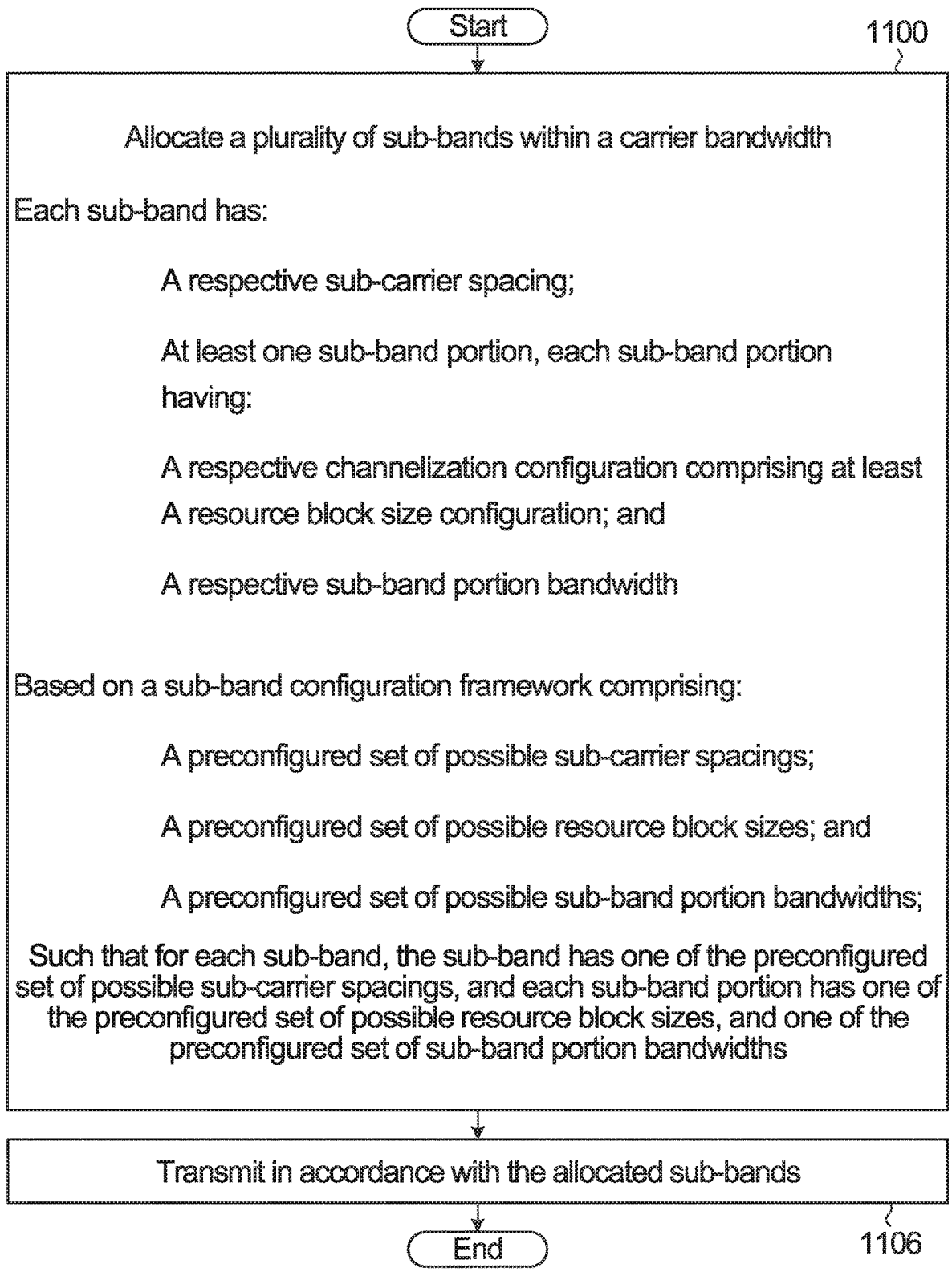
FIG. 11B is a flowchart of a method of allocating sub-bands within a carrier bandwidth.

FIG. 11 is a flowchart of a method provided by an embodiment of the disclosure. The method of FIG. 11 can be performed on the network side, for example by a base station. The method begins in block 1100 with allocating a plurality of sub-bands within a carrier bandwidth Each sub-band has:
 a respective sub-carrier spacing;
 at least one sub-band portion, each sub-band portion having:
  a respective channelization definition comprising at least a resource block size definition; and
  a respective sub-band portion bandwidth.
The sub-bands are allocated based on a sub-band definition framework comprising:
 a predefined set of possible sub-carrier spacings;
 a predefined set of possible resource block sizes; and
 a predefined set of possible sub-band portion bandwidths;

such that for each sub-band, the sub-band has one of the predefined set of possible sub-carrier spacings, and each sub-band portion has one of the predefined set of possible resource block sizes, and one of the predefined set of sub-band portion bandwidths.

The method continues with transmitting in accordance with the allocated sub-bands in block 1106.

Figure 12:
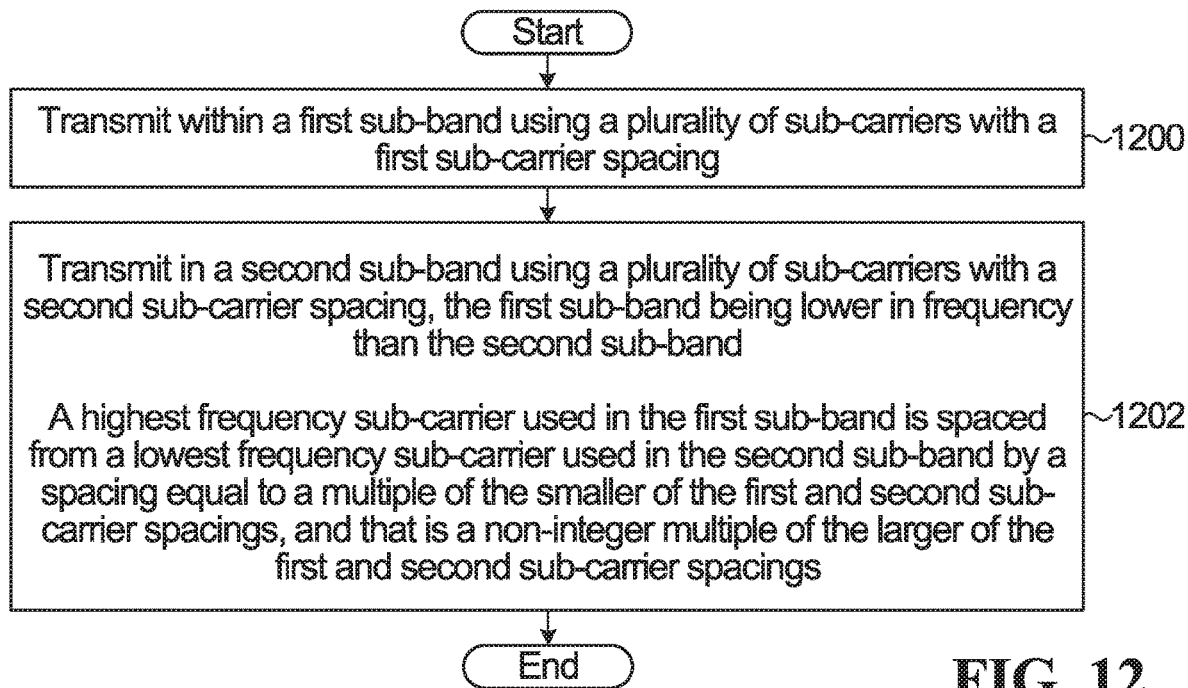
FIG. 12 is a flowchart of a method of transmitting in first and second sub-bands.

FIG. 12 is a flowchart of a method provided by an embodiment of the disclosure. The method of FIG. 12 may be performed on the network side, for example by a base station, or alternatively by a UE. The method begins in block 1200 with transmitting within a first sub-band using a plurality of sub-carriers with a first sub-carrier spacing. Block 1201 involves transmitting in a second sub-band using a plurality of sub-carriers with a second sub-carrier spacing, the first sub-band being lower in frequency than the second sub-band. A highest frequency sub-carrier used in the first sub-band is spaced from a lowest frequency sub-carrier used in the second sub-band by a spacing equal to a multiple of the smaller of the first and second sub-carrier spacings, and that is a non-integer multiple of the larger of the first and second sub-carrier spacings.

Figure 13:
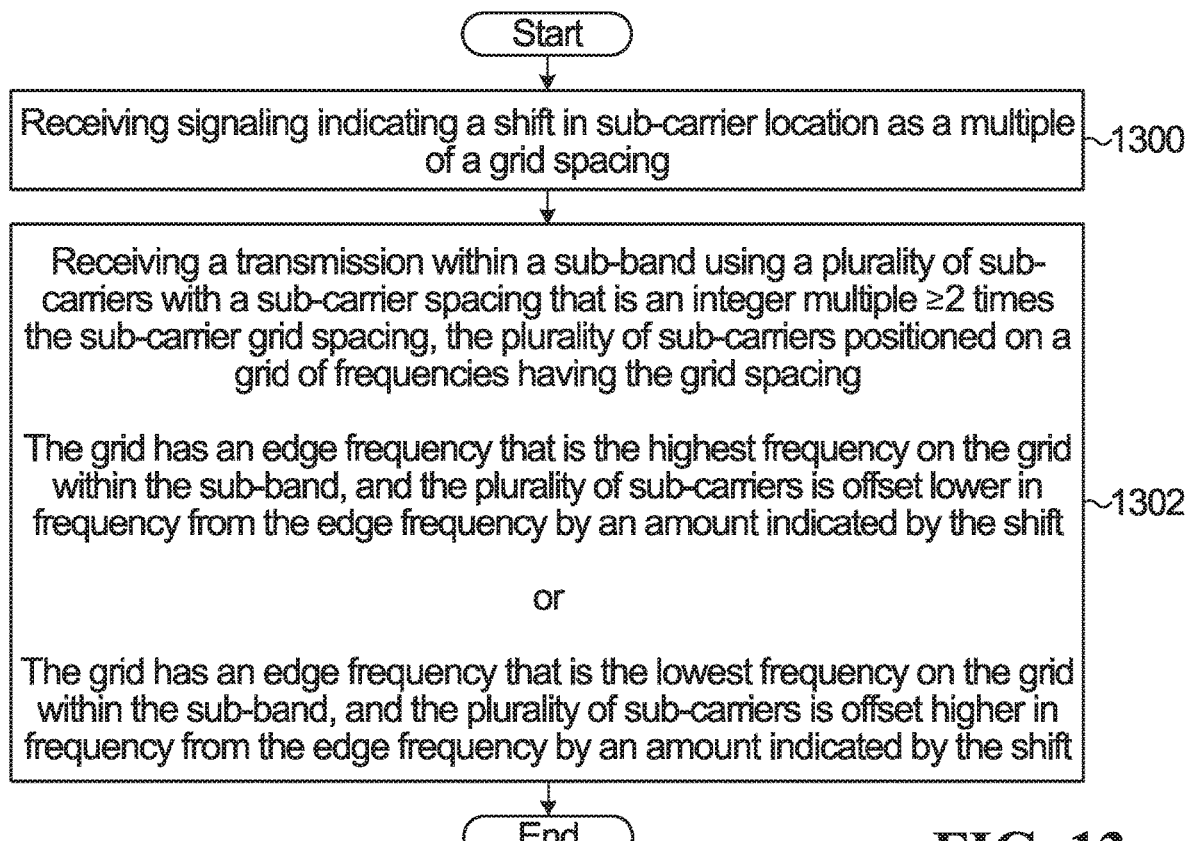
FIG. 13 is a flowchart of a method of receiving using shifted sub-carriers.

FIG. 13 is a flowchart of a method provided by an embodiment of the disclosure. The method of FIG. 13 may be performed on the network side, for example by a base station, or alternatively by a UE. The method begins in block 1300 with receiving signaling indicating a shift in sub-carrier location as a multiple of a grid spacing. Block 1302 involves receiving a transmission within a sub-band using a plurality of sub-carriers with a sub-carrier spacing that is an integer multiple ($\geq 2$) times the sub-carrier grid spacing, the plurality of sub-carriers positioned on a grid of frequencies having the grid spacing. Either the grid has an edge frequency that is the highest frequency on the grid within the sub-band, and the plurality of sub-carriers is offset lower in frequency from the edge frequency by an amount indicated by the shift or the grid has an edge frequency that is the lowest frequency on the grid within the sub-band, and the plurality of sub-carriers is offset higher in frequency from the edge frequency by an amount indicated by the shift.

Figure 14:
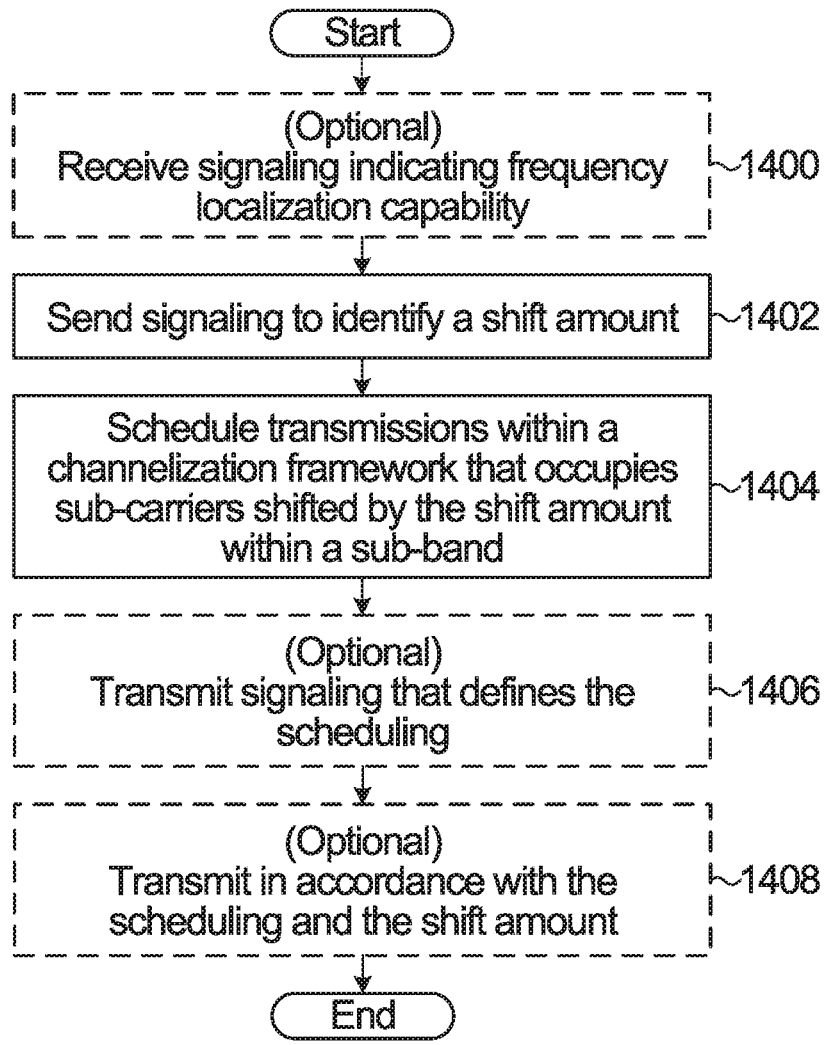
FIG. 14 is a flowchart of a method of scheduling transmissions taking into account a shift amount within a sub-band.

FIG. 14 is a flowchart of a method provided by an embodiment of the disclosure. The method of FIG. 14 may be performed on the network side, for example by a base station. Optionally, the method begins in block 1400 with the step of receiving signaling indicating transmitter frequency localization capability. In block 1402, the transmitter sends signalling identifying a shift amount for sub-carriers of a sub-band as a multiple of a frequency grid spacing. In block 1404, transmissions are scheduled within a channelization framework that occupies sub-carriers of a sub-band shifted by the shift amount. Optionally, the scheduling also takes into account one or more sub-carriers reserved as guard sub-carriers. Optionally, in block 1406, signalling is transmitted that defines the scheduling. This can indicate to a UE where downlink transmissions will occur, or can indicate to a UE where to make uplink transmissions. Optionally, in block 1408, downlink transmissions are made in accordance with the scheduling and the shift amount.

Figure 15:
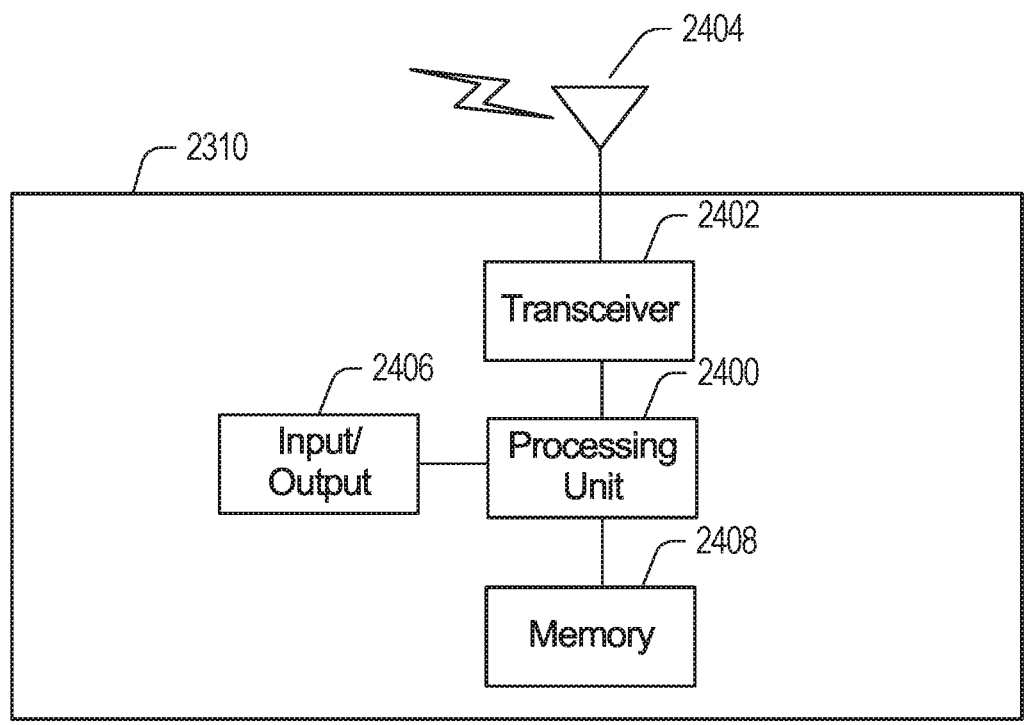
FIG. 15 is a block diagram of an example UE that may implement one or more of the methods and teachings according to this disclosure.
Figure 16:
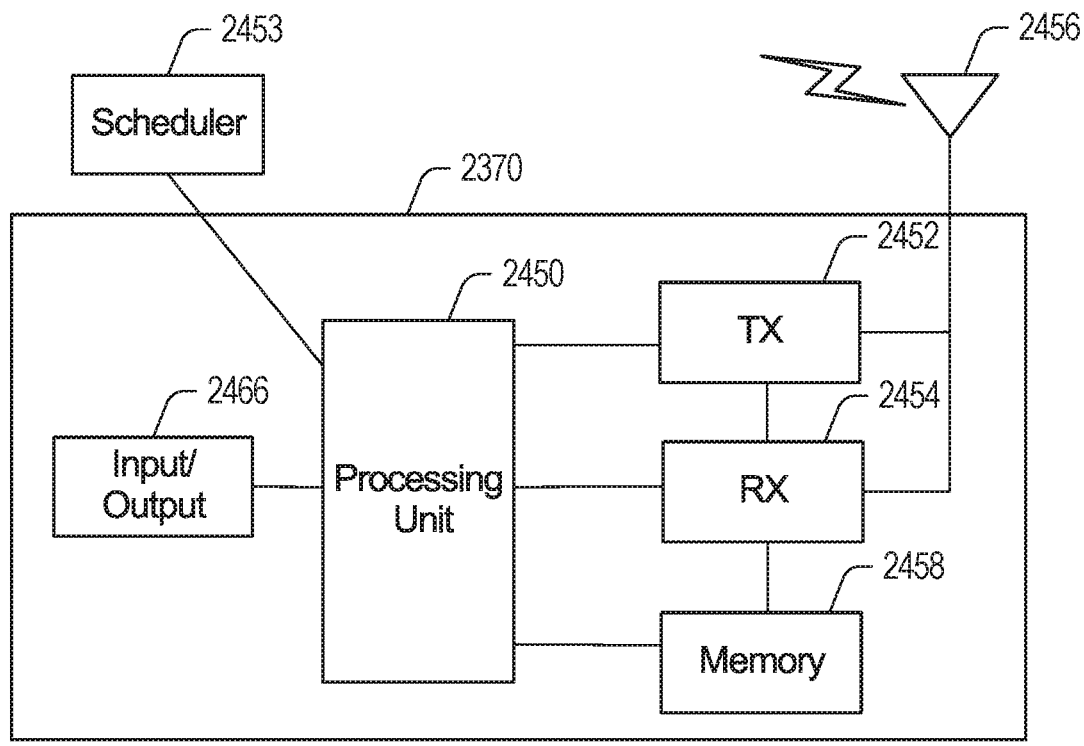
FIG. 16 is a block diagram of a base station that may implement one or more of the methods and teachings according to this disclosure.

FIGS. 15 and 16 illustrate example devices that may implement the methods and teachings according to this disclosure. In particular, FIG. 15 illustrates an example UE 2310, and FIG. 16 illustrates an example base station 2370.

As shown in FIG. 15, the UE 2310 includes at least one processing unit 2400. The processing unit 2400 implements various processing operations of the UE 2310. For example, the processing unit 2400 could perform signal coding, data processing, power control, input/output processing, or any other functionality enabling the UE 2310 to operate in the network. The processing unit 2400 may also be configured to implement some or all of the functionality and/or embodiments described in more detail above. Each processing unit 2400 includes any suitable processing or computing device configured to perform one or more operations. Each processing unit 2400 could, for example, include a microprocessor, microcontroller, digital signal processor, field programmable gate array, or application specific integrated circuit.

The UE 2310 also includes at least one transceiver 2402. The transceiver 2402 is configured to modulate data or other content for transmission by at least one antenna or Network Interface Controller (NIC) 2404. The transceiver 2402 is also configured to demodulate data or other content received by the at least one antenna 2404. Each transceiver 2402 includes any suitable structure for generating signals for wireless transmission and/or processing signals received. Each antenna 2404 includes any suitable structure for transmitting and/or receiving wireless signals. One or multiple transceivers 2402 could be used in the UE 2310, and one or multiple antennas 2404 could be used in the UE 2310. Although shown as a single functional unit, a transceiver 2402 could also be implemented using at least one transmitter and at least one separate receiver.

The UE 2310 further includes one or more input/output devices 2406 or interfaces. The input/output devices 2406 permit interaction with a user or other devices in the network. Each input/output device 2406 includes any suitable structure for providing information to or receiving information from a user, such as a speaker, microphone, keypad, keyboard, display, or touch screen, including network interface communications.

In addition, the UE 2310 includes at least one memory 2408. The memory 2408 stores instructions and data used, generated, or collected by the UE 2310. For example, the memory 2408 could store software instructions or modules configured to implement some or all of the functionality and/or embodiments described above and that are executed by the processing unit(s) 2400. Each memory 2408 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like. It is understood that the components as shown in FIG. 15 is for the purpose of illustration and the UE 2310 may include part or all of the components illustrated in FIG. 15.

As shown in FIG. 16, the base station 2370 includes at least one processing unit 2450, at least one transmitter 2452, at least one receiver 2454, one or more antennas 2456, at least one memory 2458, and one or more input/output devices or interfaces 2466. A transceiver, not shown, may be used instead of the transmitter 2452 and receiver 2454. A scheduler 2453 may be coupled to the processing unit 2450. The scheduler 2453 may be included within or operated separately from the base station 2370. The processing unit 2450 implements various processing operations of the base station 2370, such as signal coding, data processing, power control, input/output processing, or any other functionality. The processing unit 2450 can also be configured to implement some or all of the functionality and/or embodiments described in more detail above. Each processing unit 2450 includes any suitable processing or computing device configured to perform one or more operations. Each processing unit 2450 could, for example, include a microprocessor, microcontroller, digital signal processor, field programmable gate array, or application specific integrated circuit. It is understood that the components as shown in FIG. 16 is for the purpose of illustration and the base station 2370 may include part or all of the components illustrated in FIG. 16.

Each transmitter 2452 includes any suitable structure for generating signals for wireless transmission to one or more UEs or other devices. Each receiver 2454 includes any suitable structure for processing signals received from one or more UEs or other devices. Although shown as separate components, at least one transmitter 2452 and at least one receiver 2454 could be combined into a transceiver. Each antenna 2456 includes any suitable structure for transmitting and/or receiving wireless or wired signals. Although a common antenna 2456 is shown here as being coupled to both the transmitter 2452 and the receiver 2454, one or more antennas 2456 could be coupled to the transmitter(s) 2452, and one or more separate antennas 2456 could be coupled to the receiver(s) 2454. Each memory 2458 includes any suitable volatile and/or non-volatile storage and retrieval device(s) such as those described above in connection to the UE 2310. The memory 2458 stores instructions and data used, generated, or collected by the base station 2370. For example, the memory 2458 could store software instructions or modules configured to implement some or all of the functionality and/or embodiments described above and that are executed by the processing unit(s) 2450.

Each input/output device 2466 permits interaction with a user or other devices in the network. Each input/output device 2466 includes any suitable structure for providing information to or receiving/providing information from a user, including network interface communications.

Although the present disclosure describes methods and processes with steps in a certain order, one or more steps of the methods and processes may be omitted or altered as appropriate. One or more steps may take place in an order other than that in which they are described, as appropriate.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole. It is understood that selected features from one or more of the above-described embodiments may be combined to create alternative embodiments not explicitly described, features suitable for such combinations being understood within the scope of this disclosure.

The invention claimed is:

1. A method in a user equipment (UE), the method comprising:
receiving, by the UE, semi-static signaling from a base station, the semi-static signaling including a first configuration of a first bandwidth part and a second configuration of a second bandwidth part using different numerologies, each configuration comprising at least:
one of a preconfigured set of possible numerologies; and
one of a preconfigured set of possible bandwidth part bandwidths;
receiving, by the UE, dynamic signaling activating both the first configuration of the first bandwidth part and the second configuration of the second bandwidth part and indicating a resource block allocation within at least one of the activated first bandwidth part and the activated second bandwidth part; and
communicating, by the UE, with the base station using the first bandwidth part based on the first configuration of the first bandwidth part.

2. The method of claim 1 further comprising:
transmitting using the resource block allocation within the at least one of the first bandwidth part and the second bandwidth part.

3. The method of claim 1, wherein the communicating with the base station comprises receiving and/or transmitting using the configured receiver and/or transmitter.

4. The method of claim 1, wherein the UE communicates with the base station using both the first bandwidth part and the second bandwidth part simultaneously based on the first configuration of the first bandwidth part and the second configuration of the second bandwidth part.

5. A method comprising:
transmitting, by a base station, semi-static signaling to a user equipment (UE), the semi-static signaling including a first configuration of a first sub-band and a second configuration of a second sub-band using different numerologies, each configuration including:
a respective sub-carrier spacing; and
at least one sub-band portion, each sub-band portion having:
a respective channelization configuration comprising at least a resource block size configuration; and
a respective sub-band portion bandwidth;
transmitting, by the base station, dynamic signaling to the UE, the dynamic signaling activating both the first configuration of the first sub-band and the second configuration of the second sub-band and indicating a resource block allocation within at least one of the first sub-band and the second sub-band; and
transmitting, by the base station, to the UE over the first sub-band based on the first configuration of the first sub-band;

wherein the first sub-band and the second sub-band are allocated based on a sub-band configuration framework comprising:
a preconfigured set of possible sub-carrier spacings;
a preconfigured set of possible resource block sizes; and
a preconfigured set of possible sub-band portion bandwidths;
such that for each sub-band, the sub-band has one of the preconfigured set of possible sub-carrier spacings, and each sub-band portion has one of the preconfigured set of possible resource block sizes, and one of the preconfigured set of sub-band portion bandwidths.

6. The method of claim 5 wherein each respective channelization configuration for a corresponding sub-band configures:
a plurality of resource blocks having a first number of sub-carriers; and
an additional resource block having a second number of sub-carriers.

7. The method of claim 6, further comprising performing scheduling using a bitmap containing a respective bit for each of the plurality of resource blocks and the additional resource block.

8. The method of claim 5 further comprising:
allocating a guard band between an edge of a spectrum mask and an edge of a sub-band that is adjacent to the edge of the spectrum mask.

9. The method of claim 5 wherein sub-carriers of the first sub-band and the second sub-band are situated on a common grid comprising a plurality of grid frequencies spaced by a fixed spacing, such that each sub-carrier frequency is one of the plurality of grid frequencies.

10. The method of claim 9, wherein the first sub-band uses a first sub-carrier spacing, the second sub-band uses a second sub-carrier spacing, a spacing between a sub-carrier with a highest frequency in the first sub-band and a sub-carrier with a lowest frequency in the second sub-band being equal to an integer multiple of the smaller of the first sub-carrier spacing and the second sub-carrier spacing.

11. The method of claim 5, wherein the first configuration includes a first sub-band portion and the second configuration includes a second sub-band portion, and wherein the first sub-band portion and the second sub-band portion have different channelization configurations with different numbers of sub-carriers per resource block.

12. The method of claim 5 further comprising at least one of:
reserving at least one guard sub-carrier at an edge of the first sub-band adjacent the second sub-band; and
reserving at least one guard sub-carrier at an edge of the second sub-band adjacent the first sub-band.

13. The method of claim 12, further comprising adaptively configuring guard sub-carriers employed in the first sub-band and the second sub-band.

14. The method of claim 13 wherein the adaptively configured guard sub-carriers are reserved through scheduling.

15. The method of claim 13 wherein:
all sub-carriers are configured on a grid having a spacing equal to a smallest sub-carrier spacing used in the first sub-band and the second sub-band.

16. The method of claim 5 further comprising at least one of:
reserving a full or partial resource block at an edge of the first sub-band adjacent the second sub-band; and
reserving a full or partial resource block at an edge of the second sub-band adjacent the first sub-band.

17. The method of claim 5, wherein the base station transmits to the UE over both the first sub-band and the second sub-band simultaneously based on the first configuration of the first sub-band and the second configuration of the second sub-band.

18. The method of claim 5, further comprising:
transmitting using the resource block allocation within the at least one of the first sub-band and the second sub-band.

19. A base station comprising:
a processor that allocates a first sub-band and a second sub-band within a carrier bandwidth to a user equipment (UE) such that each sub-band has:
a respective sub-carrier spacing;
at least one sub-band portion, each sub-band portion having:
a respective channelization configuration comprising at least a resource block size configuration; and
a respective sub-band portion bandwidth;
wherein the sub-bands are allocated based on a sub-band configuration framework comprising:
a preconfigured set of possible sub-carrier spacings;
a preconfigured set of possible resource block sizes; and
a preconfigured set of possible sub-band portion bandwidths;
such that for each sub-band, the sub-band has one of the preconfigured set of possible sub-carrier spacings, and each sub-band portion has one of the preconfigured set of possible resource block sizes, and one of the preconfigured set of sub-band portion bandwidths;
a transmitter configured to:
transmit semi-static signaling to the UE, the semi-static signaling including a first configuration of the first sub-band and a second configuration of the second sub-band;
transmit dynamic signaling to the UE, the dynamic signaling activating both the first configuration of the first sub-band and the second configuration of the second sub-band and indicating a resource block allocation within at least one of the first sub-band and the second sub-band; and
transmit to the UE over the first sub-band based on the first configuration of the first sub-band.

20. The base station of claim 19 wherein each respective channelization configuration for a corresponding sub-band configures:
a plurality of resource blocks having a first number of sub-carriers; and
an additional resource block having a second number of sub-carriers.

21. The base station of claim 19, wherein the first configuration includes a first sub-band portion and the second configuration includes a second sub-band portion, and wherein the first sub-band portion and the second sub-band portion have different channelization configurations with different numbers of sub-carriers per resource block.

* * * * *